(12) United States Patent  
Takeuchi

(10) Patent No.: US 8,503,032 B2  
(45) Date of Patent: Aug. 6, 2013

(54) PRINTING SYSTEM, PRINTING CONTROL METHOD, AND PRINTING CONTROL PROGRAM

(75) Inventor: Hiroshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 13/074,112

(22) Filed: Mar. 29, 2011

(65) Prior Publication Data

US 2011/0242559 A1 Oct. 6, 2011

(30) Foreign Application Priority Data

Apr. 1, 2010 (JP) ................................. 2010-085191

(51) Int. Cl.
- *H04N 1/60* (2006.01)
- *G06K 15/00* (2006.01)
- *G06K 15/02* (2006.01)
- *G06F 3/12* (2006.01)

(52) U.S. Cl.  
USPC ............ 358/1.9; 358/1.18; 358/1.2; 358/1.13

(58) Field of Classification Search  
USPC ................... 358/1.9, 1.18, 1.2, 1.13  
See application file for complete search history.

(56) References Cited

U.S. PATENT DOCUMENTS

| | | | | |
|---|---|---|---|---|
| 7,317,552 B2* | 1/2008 | Sumiuchi | ........................ | 358/1.2 |
| 7,633,659 B2* | 12/2009 | Uotani et al. | .................. | 358/527 |
| 8,184,337 B2* | 5/2012 | Sakai | .............................. | 358/1.9 |
| 2004/0013455 A1 | 1/2004 | Matsuyama | | |
| 2007/0002379 A1 | 1/2007 | Momose | | |
| 2007/0024874 A1* | 2/2007 | Kawamura | ...................... | 358/1.2 |
| 2011/0051195 A1* | 3/2011 | Kimoto | ........................ | 358/1.18 |

FOREIGN PATENT DOCUMENTS

| JP | 2004-098656 A | 4/2004 |
|---|---|---|
| JP | 2004-175014 A | 6/2004 |
| JP | 2007-043640 A | 2/2007 |

* cited by examiner

*Primary Examiner* — Charlotte M Baker  
(74) *Attorney, Agent, or Firm* — Global IP Counselors, LLP

(57) ABSTRACT

A printing apparatus includes an extracting section configured to extract first and second images from an original document such that the first and second images partially overlap at an overlapping portion, and a control section configured to execute printing onto a first medium based on the first image using a layout in which at least a portion of the overlapping portion of the first image extends beyond a first edge of the first medium and a margin is formed between a second edge and an image edge of the first image, and to execute printing onto a second medium based on the second image using a layout in which at least a portion of the overlapping portion of the second image extends beyond a first edge of the second medium and a margin is formed between a second edge and an image edge of the second image.

7 Claims, 21 Drawing Sheets

US 8,503,032 B2

PRINTING SYSTEM, PRINTING CONTROL METHOD, AND PRINTING CONTROL PROGRAM

CROSS-REFERENCE TO RELATED APPLICATIONS

This application claims priority to Japanese Patent Application No. 2010-085191 filed on Apr. 1, 2010. The entire disclosure of Japanese Patent Application No. 2010-085191 is hereby incorporated herein by reference.

BACKGROUND

1. Technical Field

The present invention relates to a printing system, a printing control method, and a printing control program.

2. Related Art

Poster printing is known in the field of printing. Poster printing refers to a process and action whereby an image constituting one page is enlarged and divided into sections and the enlarged sections of the image are printed onto a size of paper that can be handled by a printer. The pieces of paper having the sections of the image printed thereon are then pieced together by a user to obtain a single large print result (poster). Known technologies related to poster printing will now be explained.

Japanese Laid-Open Patent Application No. 2004-98656 presents a printing apparatus comprising a printing means and an output means. The printing means is configured to receive a print image encompassing a region larger than a size of a printer paper and execute printing with no margins. Based on instructions for dividing data corresponding to one page into sections and printing the sections on a plurality of pages, the output means divides the print image into sections such that a section printed onto one sheet of printer paper will partially overlap with sections printed onto adjacent sheets of printer paper and outputs the divided print image sections to the printing means. Japanese Laid-Open Patent Application No. 2004-175014 presents a printer configured to divide a print object into sections and arrange the print object sections on a plurality of faces of a folded sheet of printer paper. The printer prints the print object sections in a borderless fashion with respect to crease lines where the printer paper is folded such that an image that is continuous at the crease lines can be obtained when printing is completed and the paper is unfolded. Japanese Laid-Open Patent Application No. 2007-43640 presents a printing system configured to prepare a base image for cutting out (for borderless printing) and to divide the base image into cut-out sectional images to be arranged in a print region. The cut-out sectional images are configured such that when the cut-out sectional images are printed onto separate sheets of printer paper and the sheets of printer paper are arranged such that each sectional image overlaps with another adjacent sectional image, a continuity of the image is maintained between adjacent sheets of printer paper.

SUMMARY

When poster printing is conducted using a method in which sections of an image are printed onto a plurality of sheets of paper and the sheets of paper are joined together to form one poster, a large burden of work is placed on the user if the printing leaves borders (margins) on the top, bottom, left, and right of the paper because the user will need to cut the margin portions off each of the sheets of paper. In the patent documents mentioned above, the burden placed on the user is reduced to some extent by printing the image sections on the paper in a borderless fashion. However, depending on the specifications of the printer, the printer may not be capable of executing borderless printing on all of the sizes of paper that the printer is capable of accommodating. Thus, since borderless printing cannot be executed onto some sizes of paper, a user needing to perform poster printing on to such a size of paper will still face the burden of having to cut off the margins. Furthermore, the burden placed on the user is larger when a poster is made using a large size of paper with a printer configured to accommodate large-size printing.

The present invention was conceived to resolve the problem explained above and its object is to provide a printing system, a printing control method, and a printing control program that can execute printing in such a manner that when a user attempts to print onto a plurality of media and join the media together to obtain a single print result, the burden and amount of trouble born by the user can be reduced in comparison with conventional technologies.

One aspect of the present invention is a printing system including a printing section, an extracting section, and a control section. The printing section has a mechanism for printing borderlessly at a first edge of a first type of medium and does not have a mechanism for printing borderlessly at a second edge of the first type of medium located on an opposite side of the first type of medium as the first edge. The extracting section is configured to extract a first image and a second image from an original document such that the first image and the second image partially overlap each other at an overlapping portion. The control section is configured to control the printing section to execute printing onto a first medium of the first type based on the first image using a layout in which at least a portion of the overlapping portion of the first image extends beyond the first edge of the first medium and a margin is formed between the second edge of the first medium and an image edge of the first image located on an opposite side of the overlapping portion of the first image. The control section is further configured to control the printing section to execute printing onto a second medium of the first type based on the second image using a layout in which at least a portion of the overlapping portion of the second image extends beyond the first edge of the second medium and a margin is formed between the second edge of the second medium and an image edge of the second image located on an opposite side of the overlapping portion of the second image.

With the present invention, the printing section is not provided with a mechanism for printing borderlessly on the second edge of the medium. Thus, even if a first type of medium on which the printing section cannot print borderlessly is used for printing, a portion of a side of a first image corresponding to an overlapping portion and a portion of a side of a second image corresponding to an overlapping portion are printed such that they extend beyond the first edge of the medium. Consequently, a user can obtain a poster including the first image and the second image without the conventional troublesome task of cutting off a margin by merely joining the edge (first edge) of a first medium on which the overlapping portion of the first image is printed with the edge (first edge) of a second medium on which the overlapping portion of the second image is printed. Moreover, the printing section executes printing by ejecting ink droplets onto a medium, and the aforementioned mechanism for printing borderlessly is an ink receiving member for receiving ink droplets that are ejected beyond the medium.

The printing system further includes a rotating section configured to rotate the first image such that the overlapping portion of the first image and the overlapping portion of the second image are oriented in the same direction. The printing section is further provided with a mechanism for printing borderlessly at a first edge of a second type of medium and a second edge located on an opposite side of the second type of medium as the first edge. The control section is configured such that when printing will be executed onto a medium of the first type, the control section executes control such that the rotating section rotates the first image and the printing section executes printing onto a first medium of the first type based on the first image using a layout in which at least a portion of the overlapping portion of the rotated first image extends beyond the first edge of the first medium and a margin is formed between the second edge of the first medium and an image edge of the first image located on an opposite side of the overlapping portion of the first image. Meanwhile, when printing will be executed onto a medium of the second type, the control section controls the printing section to execute printing onto a third medium of the second type based on the first image using a layout in which at least a portion of the overlapping portion of the first image extends beyond the second edge of the third medium and a margin is formed between the first edge of the third medium and an image edge of the first image located on an opposite side of the overlapping portion of the first image, and also controls the printing section to execute printing onto a fourth medium of the second type based on the second image using a layout in which at least a portion of the overlapping portion of the second image extends beyond the first edge of the fourth medium and a margin is formed between the second edge of the fourth medium and an image edge of the second image located on an opposite side of the overlapping portion of the second image. With these constituent features, even if a first type of medium on which the printing section cannot print borderlessly is used for printing, a portion of an overlapping portion of a first image can be insured to extend beyond a first edge of the medium by rotating the first image. Also, when a second type of medium on which the printing section cannot print borderlessly is used for printing, printing is executed such that a portion of an overlapping portion of a first image extends beyond a second edge of the medium and printing is executed such that a portion of an overlapping portion of a second image extends beyond a first edge of the medium without rotating either of the images. As a result, regardless of whether a first type of medium is used for printing or a second type of medium is used for printing, a user can easily obtain a poster based on a first image and a second image.

It is acceptable to contrive the aforementioned control section such that either a printing mode characterized by a first quality level or a printing mode characterized by a second quality level that is higher in quality than the first quality level can be selected from an external source, and contrive the control section to execute control such that the printing section executes printing using a layout in which a portion of an image extends beyond at least one edge of a medium when the printing mode characterized by the first quality level is selected and executes printing using a layout in which a margin is formed between the image and four edges (all edges) of the medium when the printing mode characterized by the second quality level is selected. With these constituent features, a user can select a printing mode in which a lower quality poster can be obtained with less effort or a printing mode in which a higher quality poster can be obtained with the additional effort of cutting off margins.

It is also acceptable if: the printing section is provided with a mechanism for printing borderlessly with respect to one edge of a third type of cut paper and not provided with a mechanism for printing borderlessly with respect to edges other than the first edge of the third type of cut paper; the extracting section is configured to extract four images from an original document in a 2×2 arrangement such that images arranged adjacent to each other along a short edge direction partially overlap each other at an overlapping portion existing along a long edge; the printing system is provided with a rotating section configured to rotate a pair of the images such that one pair of the images including two of the images arranged adjacent to each other in a long edge direction and another pair of the images including two of the images arranged adjacent to each other in a long edge direction are arranged in such an orientation that a long edge on the side of the one pair of images where the overlapping portion exists and a long edge on the side of the other pair of images where an overlapping portion exists face in the same direction; and the control section is configured to control the printing section to print the four images onto sheets of the third type of cut paper using a layout in which at least a portion of the overlapping portion of each of the images extends beyond the first edge of the cut paper and a margin is formed between the image and each of the edges other than the first edge. With these constituent features, when a poster is made by gathering together sheets of cut paper on which the images have been printed, it is only necessary to cut off margins from a bottom end of two sheets of the medium and from a top end of two other sheets of the medium. Thus, the amount of work required of a user is reduced in comparison with a conventional technology requiring margins to be cut off the top, bottom, left, and right sides of all four sheets of the medium.

The technical idea of the present invention can be applied to something other than a printing system. For example, the invention can be applied to a method having a processing sequence configured to be executed by the previously explained printing system (a printing control method for making a printing apparatus execute printing). The invention can also be applied to a program (printing control program) configured to make a prescribed piece of hardware (printing apparatus) execute a function that the previously explained printing system is configured to execute. It is also acceptable for the printing system to be a single device (printing apparatus) or a plurality of devices (e.g., a printing apparatus and a personal computer (PC) serving to control the printing apparatus).

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will now be explained with reference to the drawings.

Figure 1:
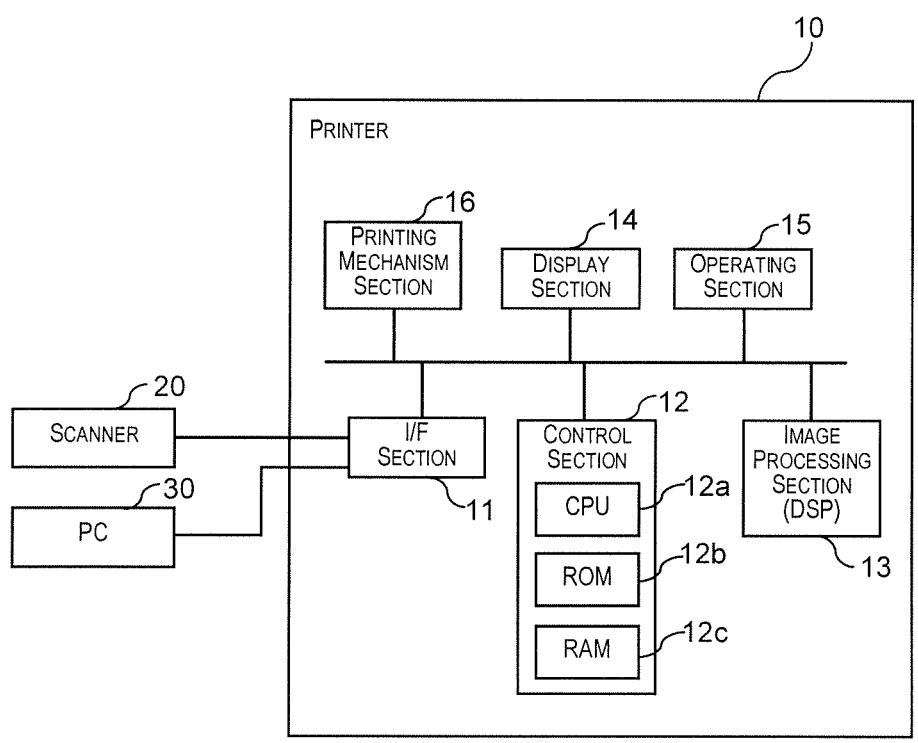
FIG. 1 is a block diagram showing basic constituent features of a printer.

FIG. 1 is a block diagram showing basic constituent features of a printer 10 according to an embodiment. The printer 10 is a printing apparatus exemplifying as a printing system according to the present invention, and operation of the printer 10 exemplifies a printing control method according to the present invention. The printer 10 is, for example, an inkjet printer comprising an interface (I/F) section 11, a control section 12, an image processing section 13, a display section 14, an operating section 15, and a printing mechanism section 16. The control section 12 includes a CPU 12a, a ROM 12b, and a RAM 12c. The I/F section 11 is, for example, a USB (universal serial bus) interface or other interface that can be communicatively connected to an image input device (scanner 20) or communicatively connected to a PC 30 serving as a control device for the printer 10.

The control section 12 is configured to control the entire printer 10 by loading a firmware or other program stored in the ROM 12b to the RAM 12c and executing the program with the CPU 12a (e.g., by executing the steps of a flowchart explained later). The operating section 15 is provided with various keys and buttons for a user to operate the printer 10. The display section 14 has a screen for displaying menus used by a user to operate the printer 10. The screen is an LCD or other type of display screen. The image processing section 13 is a DSP (Digital Signal Processor) provided separately from the control section 12 and configured to execute various image processing operations with respect to an image in response to instructions from the control section 12.

The printing mechanism section 16 is controlled/driven by the control section 12 and includes a printing head for ejecting ink droplets (dots), a carriage for executing a main scanning movement of the printing head, and a paper feeding mechanism for conveying a medium (paper). The printing mechanism section 16 is configured to be controlled by the control section 12 such that it executes printing onto a sheet of paper based on an image that has been subjected to the aforementioned various image processing operations. It is also acceptable for the printer 10 to be a line head printer. The printer 10 is configured to enable A sizes, B sizes, letter size, and other sizes of paper to be used and to enable both cut paper and roll paper to be used. In this embodiment, the printer 10 is a model capable of accommodating large paper sizes; such large size paper as A1 size roll paper and A2 size roll paper can be used for printing by setting the paper in a prescribed paper feeding position.

When the printer 10 is used for poster printing, it is more convenient for a user to print borderlessly than to print with borders, as explained previously. However, the printer 10 cannot execute borderless printing on all of the sizes of paper that it can accommodate. When borderless printing is executed, the printer 10 is ejects dots from the printing head onto a region that is slightly larger than the paper that is being used. Thus, borderless printing requires a sponge member for catching dots ejected beyond the paper. The sponge member is an ink catching member corresponding to the "mechanism for borderless printing" mentioned in the claims. The sponge member is a portion of the printing mechanism section 16 and since it includes the sponge member, the printing mechanism section 16 corresponds to the "printing section" mentioned in the claims.

Figure 2:
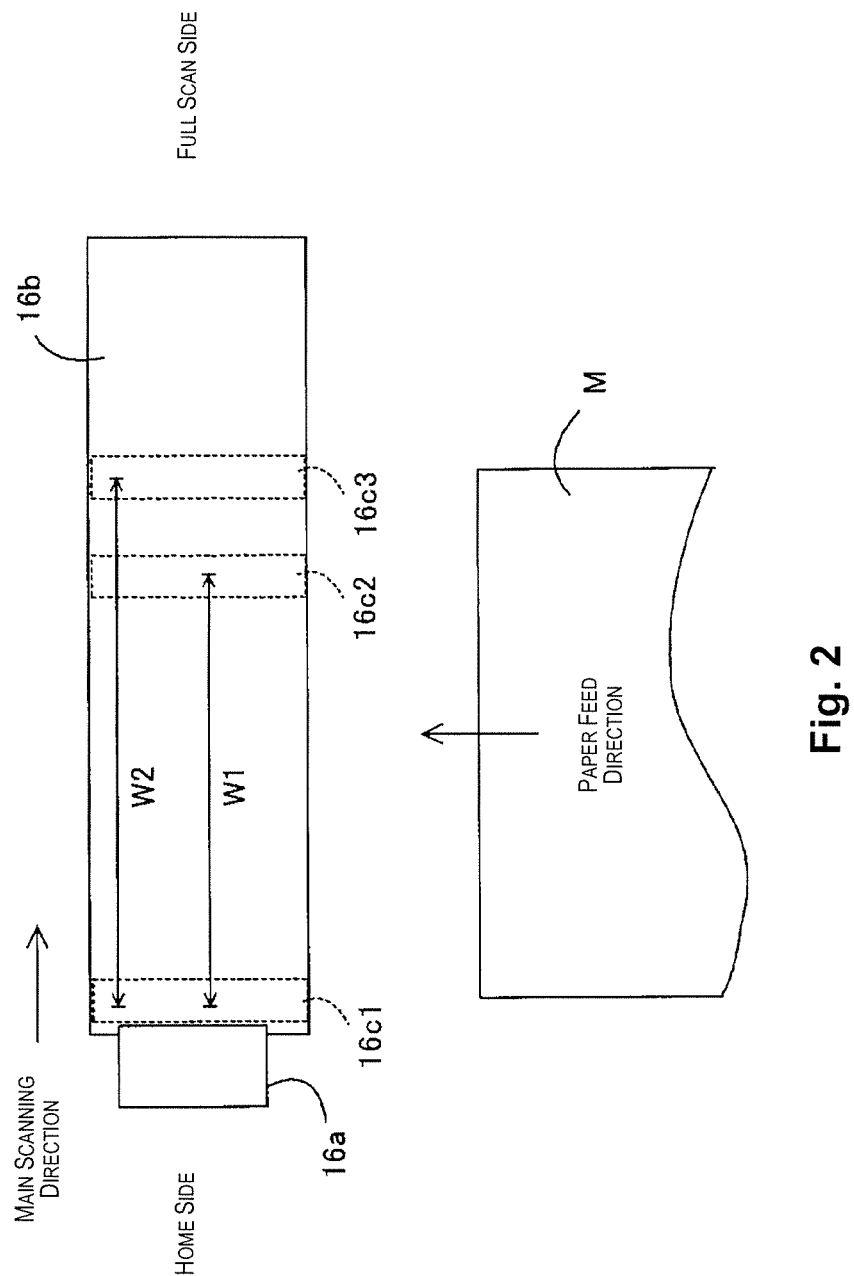
FIG. 2 shows an example of a positional relationship between a printing head and a platen.

FIG. 2 shows an example of a positional relationship of a printing head 16a and a platen 16b of the printer 10 as viewed from above the printing head 16a. The printing head 16a is mounted to the aforementioned carriage such that it can perform a main scanning movement along a main scanning direction that is perpendicular to a paper feeding direction (see FIG. 2). The sponge members 16c1, 16c2, 16c3 (indicated with chain line in FIG. 2) are arranged in prescribed positions of the platen 16b, which supports a sheet of paper M conveyed along a paper feeding direction from underneath. By providing the sponge members in positions near the edges of a sheet of paper M being conveyed (a paper edge near a default position of the printing head 16a (home side) and a paper edge on an opposite side (full scan side) as the home side), the dots ejected beyond the paper M are absorbed and dirtying of the platen 16b and other parts can be prevented.

Thus, in order for the printer 10 to execute borderless printing for every size of paper that can be used in the printer 10, it would be necessary to provide sponge members in a plurality of positions corresponding to each different size of paper. FIG. 2 shows an example in which a sponge member 16c2 is provided in a position on the full scan side that corresponds to a paper size (paper width) W1 and a sponge member 16c3 is provided in a position on the full scan side that corresponds to a paper size (paper width) W2. The sponge member 16c on the home side is shared for borderless printing on all sizes of paper. However, it is necessary to stabilize the conveyed paper M on the platen 16b (e.g., stabilize the paper M on the platen 16b by sucking air through suction holes formed in the platen 16b) and there is a possibility that the stability will decline if sponge members are provided in a large number of positions on the platen 16b. Consequently, it is necessary to provide a limit to the positions and number of sponge members.

Under such circumstances, the sizes of paper on which the printer 10 can print borderlessly are also limited For example, borderless printing cannot be executed on the aforementioned A1 and A2 sizes of paper. In other words, when paper of the size A1 or A2 is conveyed onto the platen 16*b* such that the lengthwise direction of the paper is parallel to the feed direction, a sponge member (sponge member 16*c*1) is provided on the home side of the paper (first edge side) but not on the full scan side of the paper (second edge side). Therefore, the A1 and A2 sizes of paper correspond to the "first type of medium" mentioned in the claims. Meanwhile, the when paper having the width W1 or W2 illustrated in FIG. 2 is used, a sponge member (sponge member 16*c*1) is provided on the home side of the paper (first edge side) and the sponge members 16*c*2 and 16*c*3 are provided on the full scan side of the paper (second edge side). Thus, paper having the width W1 and paper having the width W2 correspond to the "second type of medium" mentioned in the claims.

Figure 3:
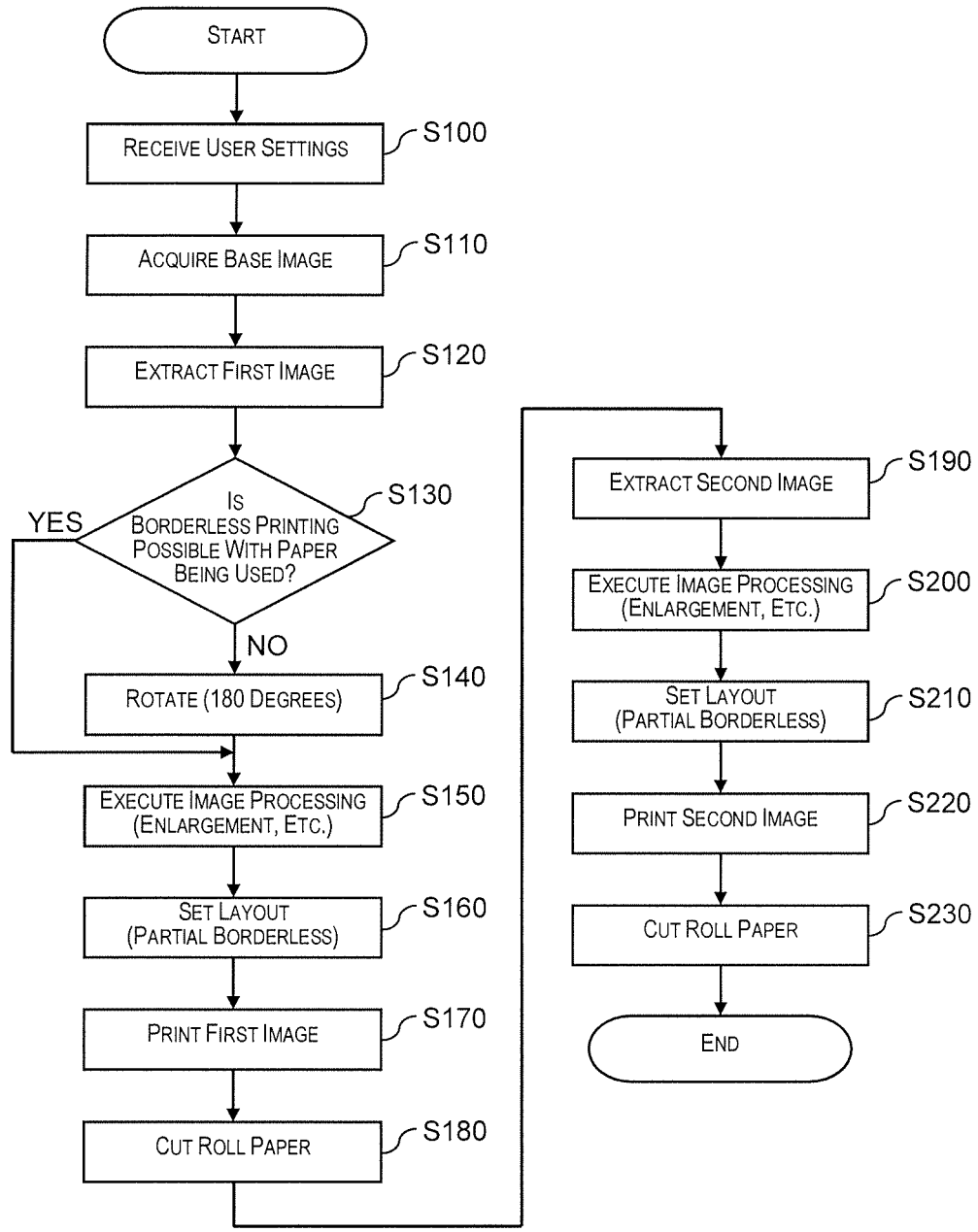
FIG. 3 is a flowchart related to poster printing.

Poster printing executed using the constituent features of the printer 10 explained above will now be explained. FIG. 3 is a flowchart of steps the printer 10 executes to accomplish poster printing. The steps of the flowchart are executed chiefly by the control section 12 and the image processing section 13. In step S100, the control section 12 receives settings inputted by a user through the operating section 15. The user selects poster printing from a menu displayed on the display section 14. The user can also set such parameters as a size of an original that will surface as a base image for the poster printing, a paper size (desired poster size) to which the original will be enlarged, and a number of sections of the poster (number of sheets of paper from which the poster will be constructed). For example, a user can set an original size to A4 (210 mm×297 mm), set a paper size to which the original will be enlarged to A0 (841 mm×1189 mm), and set the number of sections of the poster to 2. Based on the user settings (e.g., a poster dividing direction set by the user), the control section 12 determines that a roll of A2 (420 mm×594 mm) size paper will be used for printing in order to complete the A0 sized poster with two sheets of paper.

In step S110, the control section 12 acquires a base image. More specifically, the control section 12 receives a base image generated with a scanner 20 through the I/F section 11 and temporarily stores the base image in the RAM 12*c*. The scanner 20 comprises a document bed, a light source, an image sensor, and A/D converter circuit, etc., (not shown in the figures). An original document (A4) placed on the document bed is read by an image sensor, a scan image (base image) is generated by photoelectric conversion or A/D conversion, and the base image is transmitted to the printer 10. The base image comprises digital data having RGB color values (e.g., 0 to 255 corresponding to 256 color values) for each pixel.

In step S120, the control section 12 divides the base image into sections in accordance with the number of sections set as explained previously and the type of paper to be used for printing (roll paper for A2 size printing) determined as explained previously. The control section 12 then extracts a portion of the image. The A2 roll paper has a width (short edge of A2) equivalent to one-half the short edge of A0 size paper. Consequently, the A0 size poster will be completed using two portions of A2 roll paper, each portion having a size corresponding to two sheets of A2 cut paper (length of short edge is one-half length of short edge of A0 paper and length of long edge is equal to length of lone edge of A0 paper). Thus, in this embodiment, the control section 12 extracts an image (first image SI1) that includes a region of the base image corresponding to one side of the divided base image, which has been divided through the short edges into two equal halves. Also, in a subsequent step S190, the control section 12 extracts an image (second image SI2) that includes a region of the base image corresponding to the other side of the divided base image (which has been divided through the short edges into two equal halves.

Figure 4:
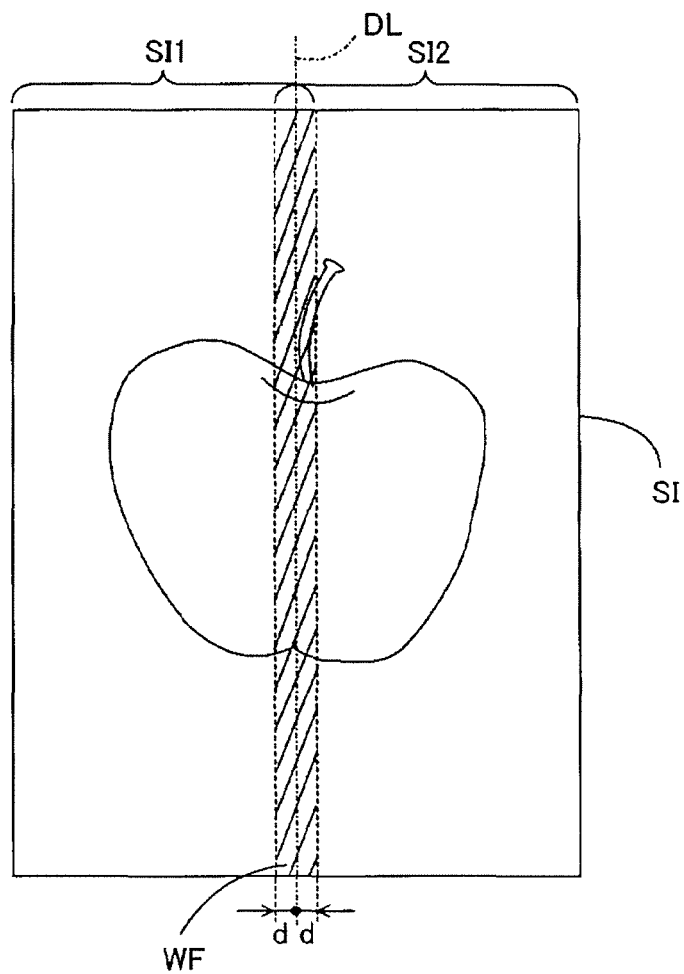
FIG. 4 illustrates an example of a relationship between a base image expressing an original document and a first image and a second image.

FIG. 4 shows an example of a relationship between a base image SI expressing the original illustration and the extracted first and second images SI1 and SI2. In FIG. 4, the base image SI is indicated as a rectangle drawn with a solid line, and the base image SI is divided into two equal halves by a dividing line DL passing through the short edges. In step S120, the control section 12 extracts a portion of the base image SI that includes the entire region on one side of the dividing line DL as well as a portion on the other side of the dividing line DL that spans up to a prescribed distance d away from the dividing line DL. This extracted rectangular region constitutes the first image SI1. Similarly, in step S190, the control section 12 extracts a portion of the base image SI that includes the entire region on the other side of the dividing line DL as well as a portion on the first side of the dividing line DL that spans up to a prescribed distance d away from the dividing line DL. This extracted rectangular region constitutes the second image SI2. Thus, the first image SI1 and the second image SI2 are configured to have an overlapping region (overlapping portion) WF where they overlap each other. In this embodiment, the overlapping region WF is indicated with hatching.

In the explanation of the flowchart of FIG. 3, the extracted image whose long edge on the side corresponding to the overlapping region WF does not face the home side is called the first image, and the extracted image whose long edge located on the side corresponding to the overlapping region WF does face the home side is called the second image. Regarding the printer 10, the side located leftward with respect to a paper feed direction is assumed to be the home side (see FIG. 2) and an image is printed starting from an upper end of the medium. Consequently, of the two extracted images, the image located on the left hand side corresponds to an image (first image) whose long edge corresponding to the overlapping region WF does not face the home side.

Thus, the control section 12 can be said to function as an extracting section when it executes step S110 I in which the original document (base image expressing the original document) is acquired and step S120 (and the subsequent step S190) in which the first image SI1 and the second image SI2 are extracted such that a portion of each overlaps at an overlapping portion. However, instead of contriving the control section 12 to extract the first image SI1 and the second image SI2 from a base image generated by scanning the entire original document with the scanner 20, it is also acceptable to contrive the control section 12 to acquire a first image SI1 generated by scanning the original document with the scanner 20 and, at a separate timing, acquire a second image SI2 generated by scanning the original document with the scanner 20. In other words, in step S110 and S120, the control section 12 could instruct the scanner 20 to scan a region of the original document corresponding to the first image SI1 by providing the scanner 20 with a specified read region and the control section 12 could then acquire the image (first image SI1) generated by scanning the specified region from the scanner 20. Similarly, in step S190, the control section 12 could instruct the scanner 20 to scan a region of the original document corresponding to the second image SI2 by providing the scanner 20 with a specified read region and the control section 12 could then acquire the image (second image SI2) generated by scanning the specified region from the scanner 20. If the control section 12 is connected to a PC 30 through the IF section 11, it is acceptable for the control section 12 to acquire an original document (base image serving as an original document) transmitted from a PC 30 and extract the first image SI1 and the second image SI2 from the acquired base image. It is also acceptable to arrange for the control section 12 to acquire from the PC 30 a first image SI1 and a second image SI2 that have already been extracted by the PC 30 from a base image expressing an original document.

In step S130, the control section 12 determines if the paper set as the size of paper to be used for printing as explained above is a type of paper that can accommodate borderless printing (the aforementioned second type of medium on which borderless printing can be performed). If it is a type of paper on which borderless printing can be performed, then the control section 12 proceeds to step S150. If it is a type of paper on which borderless printing cannot be performed, then the control section 12 proceeds to step S140. As explained previously, the printer paper used is a roll paper corresponding to the A2 size. Since the printer 10 cannot accommodate borderless printing on A2 paper, the control section 12 proceeds to step S140. In the flowchart of FIG. 3, even if the type of printer paper to be used is not paper on which borderless printing can be performed, the type of paper to be used is set to a roll paper having a width (short edge length) equal to one-half the length of the short edge of the size of paper corresponding to the enlarged original document and the number of sections into which the poser will be divided is set to two.

In step S140, the control section 12 transfers the first image SI1 from the RAM 12c to the image processing section 13 and has the image processing section 13 execute a rotation processing with respect to the first image SI1. The image processing section 13 rotates the first image SI1 180 degrees. As a result, the long edge on the side of the first image SI1 where the overlapping region WF is formed faces in the same direction as the long edge on the side of the second image SI2 (extracted later in step S190) where the overlapping region WF is formed. By executing this rotation processing, the control section 12 and the image processing section 13 can be said to function as a rotating section.

In step S150, if step S150 is being executed following step S140, the image processing section 13 executes a prescribed image processing with respect to the rotated first image SI1. When step S150 is executed directly after step S130, the control section 12 transfers the first image SI1 from the RAM 12c to the image processing section 13 and has the image processing section 13 execute the prescribed image processing with respect to the first image SI1. The prescribed image processing includes such processing as enlargement processing (resolution conversion), color conversion processing, and halftone processing with respect to the first image SI1. After executing such processing with respect to the first image SI1, the image processing section 13 transfers the processed first image (first image PI1) to the control section 12. Thus, the first image SI1 is enlarged by the enlargement processing to a prescribed size corresponding to the size of the roll paper to be used for printing, the first image SI1 is converted by the color conversion processing from an RGB color system to an ink color coordinate system (e.g., CMYK) suited to the ink used by the printer 10 on a per pixel basis, and the first image SI1 is converted by the halftone processing into data specifying dot on/off status and dot size in terms of two or four gradations on a per pixel and a per ink basis. The control section 12 is configured to store the first image PI1 transferred from the image processing section 13 temporarily in the RAM 12c.

In step S160, the control section 12 sets a layout (arrangement) of the first image PI1 on the printer paper. The layout of the first image PI1 is set such that at least a portion of the overlapping region WF of the first image PI1 (more accurately, an image region corresponding to the overlapping region WF) extends beyond an edge of the paper and such that a margin having a prescribed width is secured between the edge of the paper and the edge of the first image PI1 located on an opposite side of the overlapping portion WF of the first image PI1.

Figure 5:
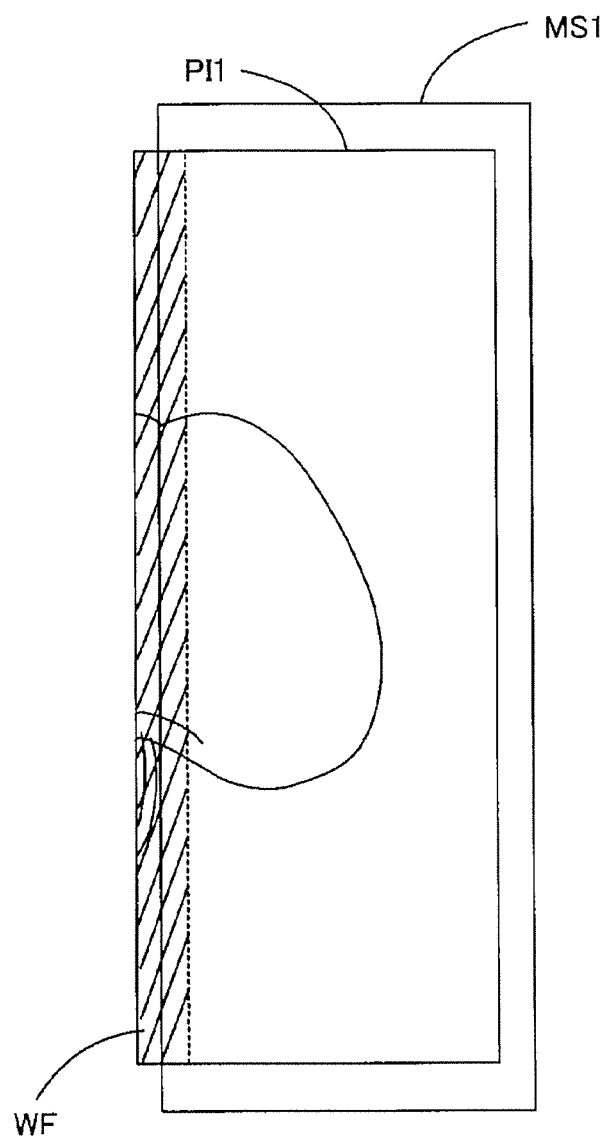
FIG. 5 is shows an example of a printing layout of the first image in which the first image has been rotated.

FIG. 5 shows a layout of the first image PI1 set in step S160 and serves as an example of a layout obtained when the first image PI1 has undergone the aforementioned rotation processing (step S140). As shown in FIG. 5, the arrangement of the first image PI1 is set on a portion of the A2 roll paper having a size MS1 corresponding to two sheets of A2 size printer paper such that a center of the overlapping region WF (a position corresponding to the dividing line DL) is coincident with the edge of the paper on the home side (left side in the figure), i.e., the half of the overlapping region WF located on the home side extends beyond the edge of the paper, and such that a margin of a prescribed width is secured on each of the other sides (upper, lower, and right sides) of the paper. As explained previously, borderless printing cannot be performed when A2 size paper is used. However, the sponge member 16c1 on the home side (see FIG. 2) can be used for borderless printing on any size of paper and, thus, the home-side edge of the paper will pass over the sponge member 16c1 even if the paper being fed is A2 size paper.

In other words, even if the paper used for printing is a size on which the printer 10 cannot normally print borderlessly, it is possible to print borderlessly (with no margin) at the home-side edge of the paper. In this embodiment, printing such that a margin is not formed at the edge of only one side of the paper is called partial borderless printing. When the control section 12 sets a layout for a size of paper that cannot be accommodated for borderless printing in step S160, it utilizes the fact that the image has been rotated by the rotation processing such that a long edge on the side where the overlapping region WF exists is oriented toward the home side and sets the layout such that a portion of the overlapping region WF extends beyond the home-side edge of the paper and partial borderless printing can be accomplished.

Figure 6:
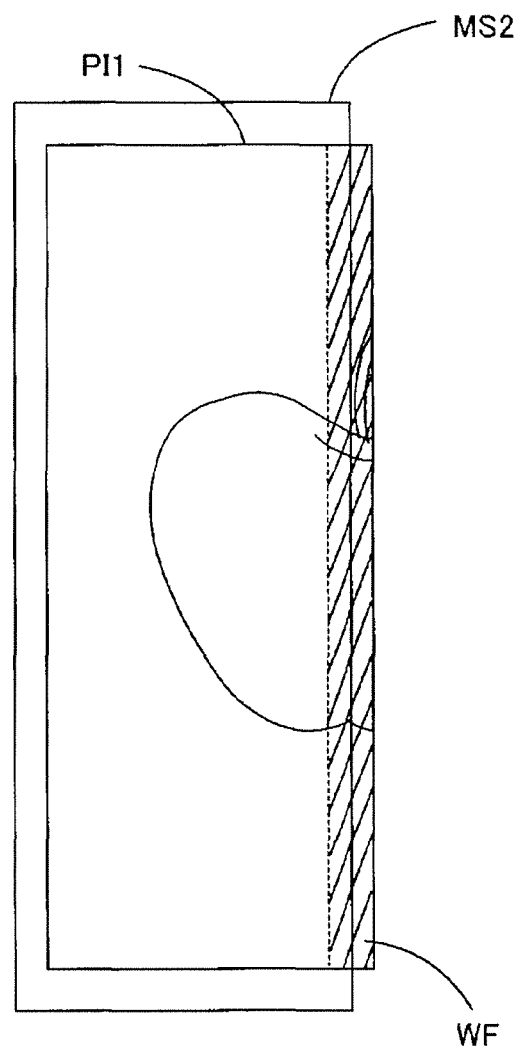
FIG. 6 shows an example of a printing layout in which the first image has not been rotated.

FIG. 6 shows a layout of the first image PI1 set in step S160 and serves as an example of a layout obtained when the first image PI1 has not undergone the aforementioned rotation processing (step S140). As shown in FIG. 6, the arrangement of the first image PI1 is set on a portion of paper having a size MS2 on which borderless printing can be performed such that a center of the overlapping region WF is coincident with the edge of the paper on the full scan side (right side in the figure), the half of the overlapping region WF located on the full scan side extends beyond the edge of the paper, and such that a margin of a prescribed width is secured on the sides (upper, lower, and left sides) of the paper. Thus, if the first image PI1 will be printed on a size of paper with which borderless printing is possible, then partial borderless printing can be performed at the edge of the paper on the full scan side and a layout like that shown in FIG. 6 can be used without executing the rotation processing (the rotation processing is not necessary).

In step S170, the control section 12 controls the printing mechanism section 16 such that the first image PI1 is printed on the paper according to the set layout.

Figure 7:
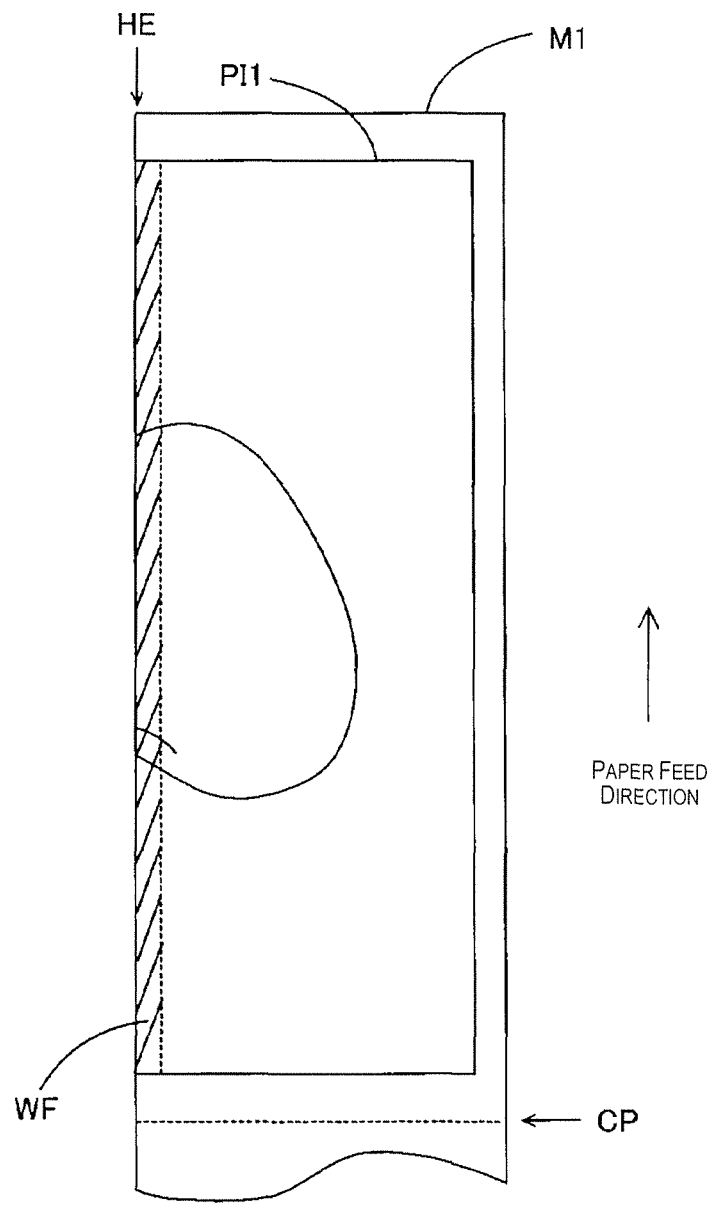
FIG. 7 shows an example of a print result obtained when the first image has been rotated.

FIG. 7 shows an example of a print result obtained when the first image PI1 has been rotated by the rotation processing (step S140) and printed on a paper M1 in step S170. The paper M1 is A2 size roll paper and the first image PI1 (more precisely, a portion of the first image PI1 excluding half of the overlapping region WF) is printed partially borderlessly on a portion of the roll paper equivalent to two sheets of A2 paper starting from a tip end of the roll paper. Thus, half of the overlapping region WF is discarded beyond the paper and only the paper edge HE on the home side of the paper M1 is printed without a margin. The paper M1 shown in FIG. 7 corresponds to the "first medium of the first type" mentioned in the claims.

Figure 8:
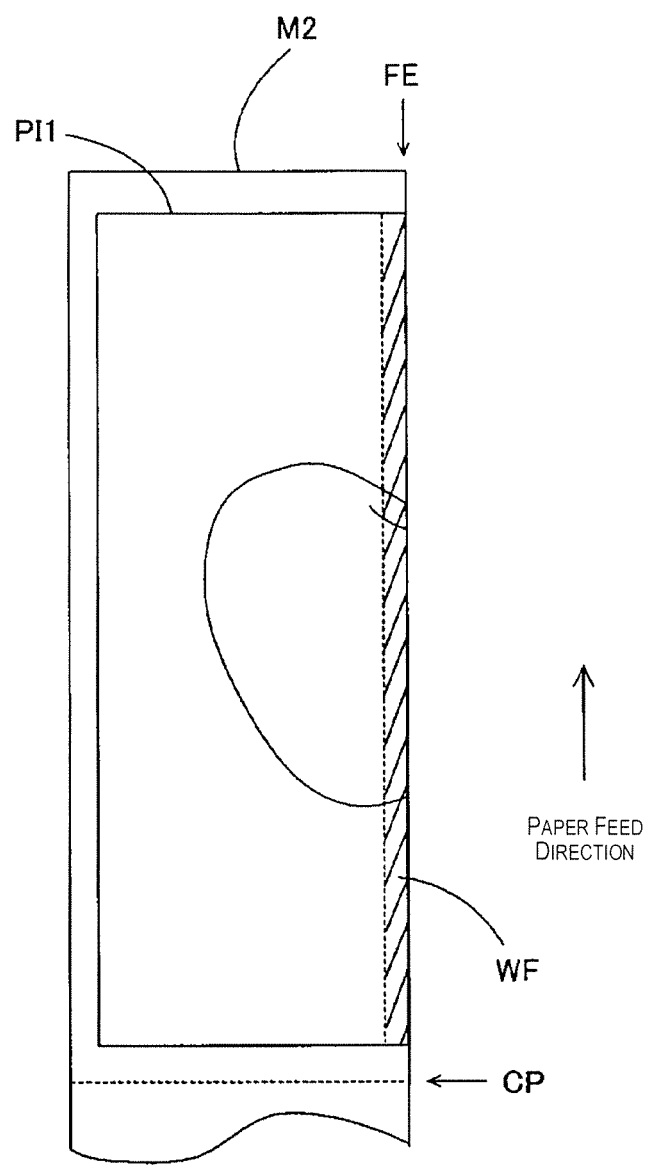
FIG. 8 shows an example of a print result obtained when the first image has not been rotated.

FIG. 8 shows an example of a print result obtained when the first image PI1 is printed on a paper M2 in step S170 without having been rotated by the rotation processing (step S140). The paper M2 is paper of a size on which borderless printing can be executed (the example shown in FIG. 8 is roll paper). The first image PI1 is printed in a prescribed region of the roll paper starting from a tip end of the roll paper such that half of the overlapping region WF is discarded beyond the paper and only the paper edge FE on the full scan side of the paper M1 is printed without a margin. The paper M2 shown in FIG. 8 corresponds to the "third medium of the second type" mentioned in the claims.

In step S180, the control section 12 controls the printing mechanism section 16 such that the roll paper on which the first image PI1 is printed is cut at a cut position CP, which is set such that the resulting length of paper equals the length of a long edge of the size of paper corresponding to the enlarged original document. As explained previously, the original document is enlarged to fit size A0 paper. Thus, if A2 size roll paper is used for printing, then the position where the roll paper is cut is located a distance equal to twice the length of a sheet of A2 paper from the tip end of the roll paper (the cut position CP is indicated with a chain line in FIG. 7). The printing mechanism section 16 has a cutter that can move back and fourth along a main scanning direction along with the carriage, and the control section 12 can control an approach and a retraction of a blade of the cutter with respect to the paper. After it adjust a feed amount of the roll paper and a position of the cutter such that the blade of the cutter contacts the paper at the cutting position CP, the control section 12 moves the cutter along with the carriage such that the paper is cut at the cutting position CP and the resulting sheet of paper is separated from the roll. As a result, a sheet of paper with the first image PI1 printed thereon is obtained. If the paper used for printing by the printer 10 is cut paper instead of roll paper, then step S180 (and step S230 described later) are not necessary.

In step S190, the control section 12 extracts a second image SI2 as explained previously. In step S200, the control section 12 transfers the second image SI2 from the RAM 12c to the image processing section 13 and has the image processing section 13 execute rotation processing with respect to the second image SI2. The prescribed image processing includes such processing as enlargement processing (resolution conversion), color conversion processing, and half tone processing with respect to the second image SI2. After executing such processing with respect to the second image SI2, the image processing section 13 transfers the processed second image (second image PI2) to the control section 12. It is not necessary to apply rotation processing to the second image SI2. In step S210, the control section 12 sets a layout of the second image PI2 on the printer paper. The layout of the second image PI2 is set such that at least a portion of the overlapping region WF of the second image PI2 extends beyond an edge of the paper located on the home side and such that a margin having a prescribed width is secured between an edge of the paper located on the full scan side and the edge of the second image PI2 located on the opposite side of the overlapping portion WF of the second image PI2.

Figure 9:
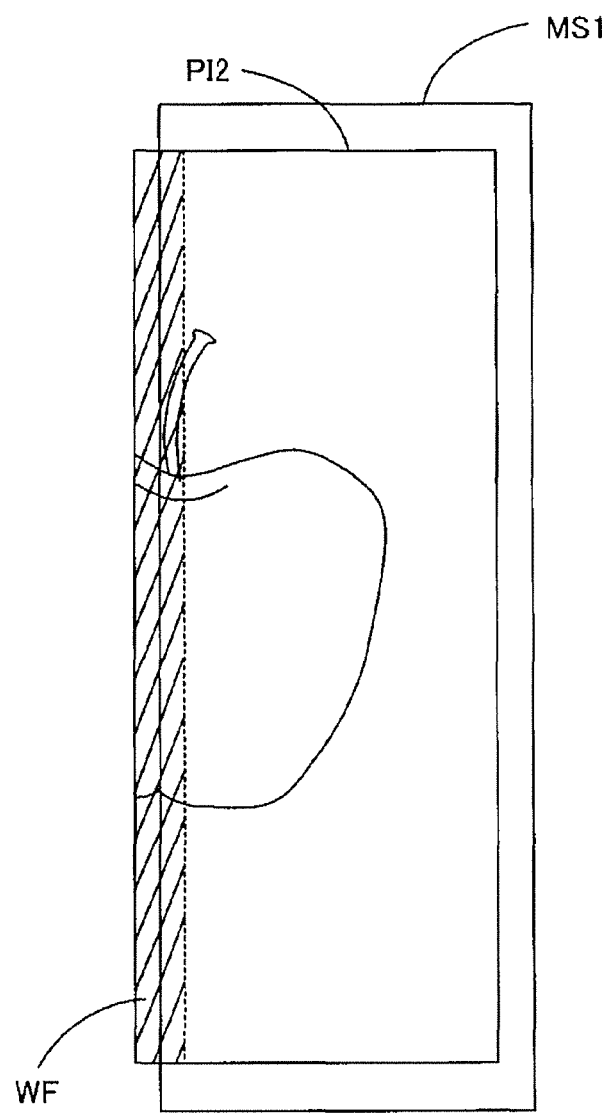
FIG. 9 shows an example of a printing layout of the second image in which the second image has not been rotated.

FIG. 9 shows an example of a layout of the second image PI2 set in step S210. As shown in FIG. 9, the arrangement of the second image PI2 is set on a portion of the A2 roll paper having a size MS1 corresponding to two sheets of A2 size printer paper such that a center of the overlapping region WF is coincident with the edge of the paper located on the home side, i.e., the half of the overlapping region WF located on the home side extends beyond the edge of the paper, and such that a margin of a prescribed width is secured on each of the other sides (upper, lower, and right sides) of the paper. Even if the paper used is of a size that can be accommodated for borderless printing, the layout of the second image PI2 on the paper is set such that a center of the overlapping region WF is coincident with the edge of the paper located on the home side, i.e., the half of the overlapping region WF located on the home side extends beyond the edge of the paper, and such that a margin of a prescribed width is secured on each of the other sides (upper, lower, and right sides) of the paper.

In step S220, the control section 12 controls the printing mechanism section 16 such that the second image PI2 is printed on the paper according to the set layout.

Figure 10:
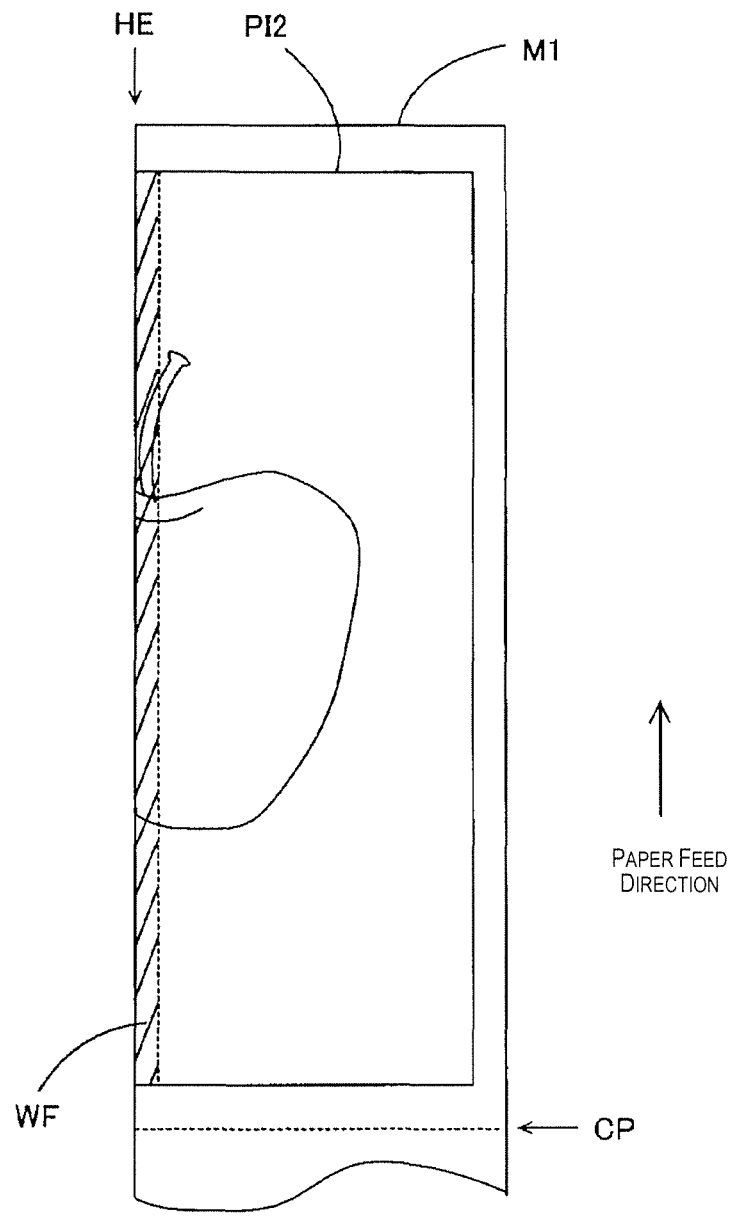
FIG. 10 shows an example of a printing result obtained when the second image is printed.

FIG. 10 shows an example of a printing result obtained when the second image PI2 is printed on the paper M1 in step S220. Similarly to the paper shown in FIG. 7, the paper M1 shown in FIG. 10 is roll paper sized to be used as A2 printer paper. The second image PI2 is printed in a prescribed region of the roll paper starting from a tip end of the roll paper and having a size equal to two sheets of A2 size paper. The second image PI2 is arranged such that half of the overlapping region WF is discarded beyond the home-side edge HE of the paper M1 and only the home-side edge HE is printed without a margin. The paper M1 shown in FIG. 10 corresponds to the "second medium of the first type" mentioned in the claims. Even if the second image PI2 is printed on paper (the paper M2 shown in FIG. 8) of a size on which printing borderlessly is possible, the second image PI2 is printed on the paper M2 (roll paper) in a prescribed region starting from a tip end of the paper M2 such that half of the overlapping region WF is discarded beyond the home-side paper edge HE and only the paper edge HE is printed without a margin. The paper M2 on which the second image PI2 is printed corresponds to the "fourth medium of the second type" mentioned in the claims. In step S230, similarly to step S180, the control section 12 controls the printing mechanism section 16 such that the roll paper on which the second image PI2 is printed is cut at a cut position CP, which is set such that the resulting length of paper equals the length of a long edge of the size of paper corresponding to the enlarged original document. After step S230, the flowchart of FIG. 3 ends.

With the embodiment explained heretofore, there are situations in which the printer 10 is used to execute poster printing on a size of paper for which normal borderless printing is not possible because a mechanism for borderless printing is not provided in a position corresponding to an edge of the paper located on the full scan side of the printer 10. In such a situation, a first image extracted from an original document in order to print onto separate pieces of paper has an overlapping region WF where the first image overlaps with a second image extracted from the original document in order to print onto separate pieces of paper, the first image is rotated such that a side of the first image where the overlapping region WF is formed faces toward the home side. The first image and the second image are then printed such that a portion of the overlapping region WF of each of the images extends beyond the home-side edge of the paper. Consequently, a user can obtain a poster comprising the first image and the second image and having a desired poster size by joining the single borderlessly printed side of the paper on which the first image is printed to the single borderlessly printed side of the paper on which the second image is printed. In other words, even if the poster is made using a size of paper on which borderless printing cannot be executed, it is not necessary to go through the troublesome process of cutting off margins in the conventional manner.

The present invention is not limited to the embodiment described above and various modifications can be made without departing from the scope of the invention as defined in the claims. Some variations that can be adopted in the embodiment will now be explained. Constituent features that are not discussed in the following explanations are assumed to be basically the same as the constituent features of the previously explained embodiment.

First Variation

Figure 11:
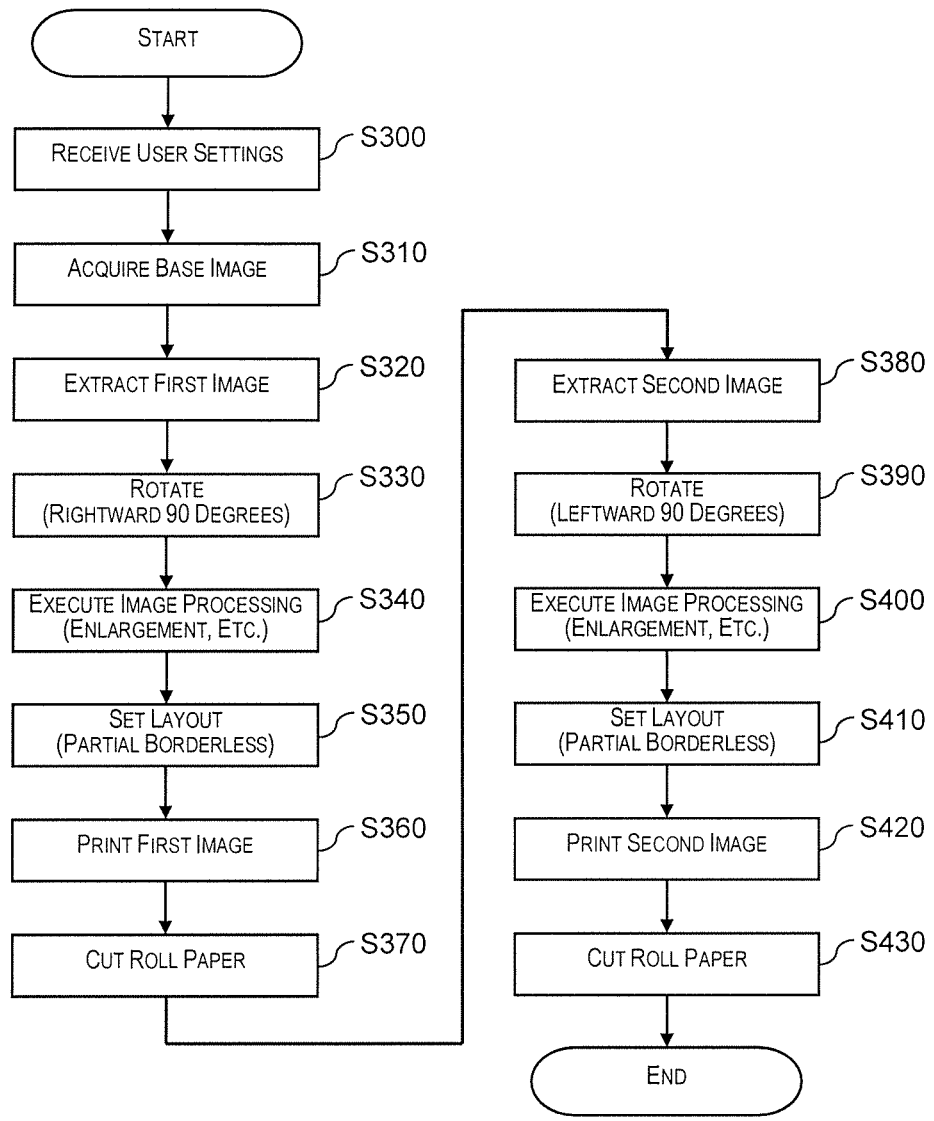
FIG. 11 is a flowchart related to poster printing according to a first variation.

FIG. 11 is a flowchart of steps the printer 10 executes to accomplish poster printing. Some steps are different from the steps of the flowchart shown in FIG. 3. In step S300, similarly to step S100, the control section 12 receives settings inputted by a user through the operating section 15. In this variation, the original document size is set to A4 and the paper size corresponding the original document after it is enlarged is set to A0. Thus, the number of sections into which the poster is divided is set to 2 as in the previous embodiment. However, in this variation, based on the settings inputted by the use (e.g., the direction in which the poster will be divided), the control section 12 sets a roll paper configured to be used as A1 (594 mm×841 mm) size paper is set as the paper to be used for printing in order to complete the A0 sized poster with two sheets of paper.

Step S310 is the same as step S110. In step S320, the control section 12 divides the base image into sections in accordance with the number of sections set as explained previously and the type of paper to be used for printing (roll paper for A1 size printing) determined as explained previously. The control section 12 then extracts a portion of the image. The A1 roll paper has a width (equal to the length of a short edge of A1 size paper) equivalent to one-half the long edge of A0 size paper. Consequently, a portion of the A1 roll paper equivalent in size to two sheets of A1 cut paper is required to complete the A0 size poster. Thus, in this variation, the control section 12 extracts an image (first image SI1) that includes a region of the base image corresponding to one side of the divided base image, which has been divided through the long edges into two equal halves. Also, in a subsequent step S380, the control section 12 extracts an image (second image SI2) that includes a region of the base image corresponding to the other side of the divided base image (which has been divided through the long edges into two equal halves).

Figure 12:
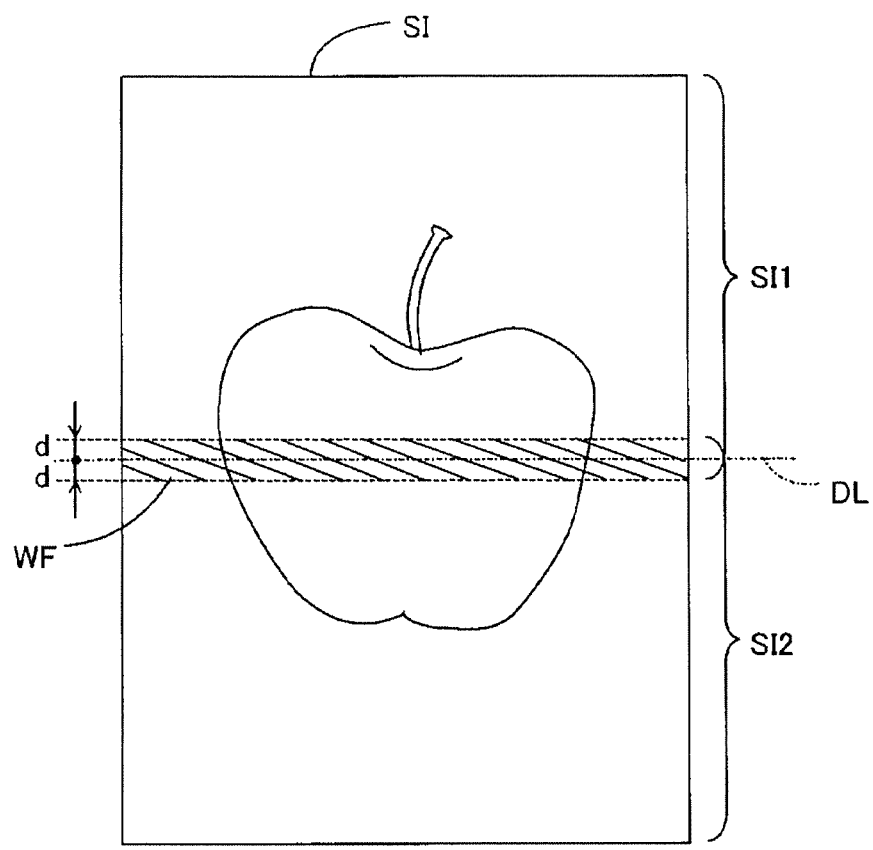
FIG. 12 illustrates an example of a relationship between a base image expressing an original document and a first image and a second image in a first variation.

FIG. 12 shows an example of a relationship between the base image SI and the extracted first and second images SI1 and SI2. In FIG. 12, the base image SI is indicated as a rectangle drawn with a solid line, and the base image SI is divided into two equal halves by a division line DL passing through the long edges. In step S320, the control section 12 extracts a portion of the base image SI that includes the entire region on one side of the dividing line DL as well as a portion on the other side of the dividing line DL that spans up to a prescribed distance d away from the dividing line DL. This extracted rectangular region constitutes a first image SI1. Similarly, in step S380, the control section 12 extracts a portion of the base image SI that includes the entire region on the other side of the dividing line DL as well as a portion on the first side of the dividing line DL that spans up to a prescribed distance d away from the dividing line DL. This extracted rectangular region constitutes a second image SI2. Thus, the first image SI1 and the second image SI2 are configured to have an overlapping region WF where they overlap each other. In the explanation of the flowchart shown in FIG. 12 that follows, upper image of the two extracted images is called the "first image" and the lower image is called the "second image" for convenience.

In step S330, the control section 12 has the image processing section 13 execute a rotation processing with respect to the first image SI1. The image processing section 13 rotates the first image SI1 rightward 90 degrees. In this way, the long edge of the first image SI1 on the side where the overlapping region WF is formed is oriented toward the home side. In step S340, the image processing section 13 executes a prescribed image processing with respect to the rotated first image SI1. More specifically, the image processing includes an enlargement processing that enlarges the first image SI1 to a prescribed size corresponding to the A1 size paper that will be used for printing and a color conversion processing and halftone processing. As a result, the first image SI1 is converted to a first image PI1. Step S350 is the same as step S160.

Figure 13:
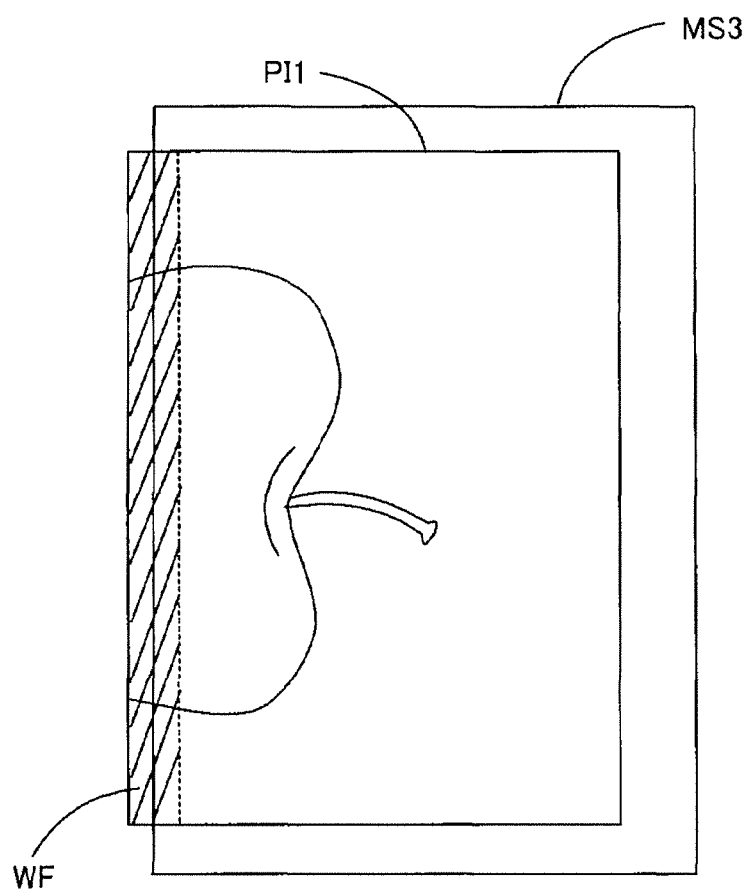
FIG. 13 is shows an example of a printing layout of the first image in which the first image has been rotated according to the first variation.

FIG. 13 shows an example of a layout of the first image PI1 set in step S350. As shown in FIG. 13, the arrangement of the first image PI1 is set on a portion of the A1 roll paper having a size MS3 corresponding to one sheet of A1 size printer paper such that a center of the overlapping region WF is coincident with the edge of the paper located on the home side (left side in the figure), i.e., the half of the overlapping region WF located on the home side extends beyond the edge of the paper, and such that a margin of a prescribed width is secured on each of the other sides (upper, lower, and right sides) of the paper. Step S360 is the same as step S170.

Figure 14:
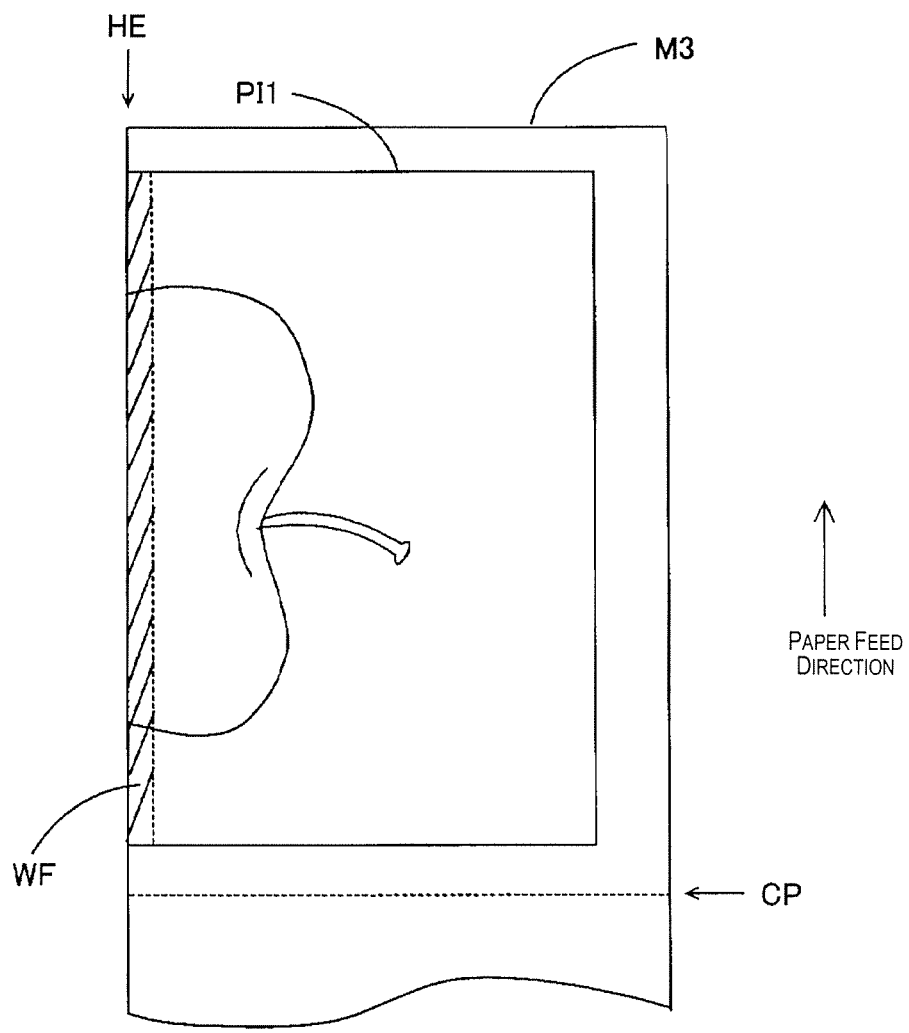
FIG. 14 is shows an example of a print result obtained when the first image has been rotated according to the first variation.

FIG. 14 shows an example of a printing result obtained when the first image PI1 is printed on the paper M3 in step S360. The paper M3 is roll paper for A1 size printing. The first image PI1 is printed in a prescribed region of the roll paper starting from a tip end of the roll paper and having a size equal to one sheet of A1 size paper. The first image PI1 is arranged such that half of the overlapping region WF is discarded beyond the home-side edge HE of the paper M3 and only the home-side edge HE is printed without a margin. Step S370 is the same as step S180. In step S380, the control section 12 extracts a second image SI2 (see FIG. 12) as explained previously. In step S390, the control section 12 has the image processing section 13 execute a rotation processing with respect to the second image SI2. The image processing section 13 rotates the second image SI2 leftward 90 degrees. In this way, the long edge of the second image SI2 on the side where the overlapping region WF is formed is oriented toward the home side. Similarly to the steps S340 to S370, in steps S400 to S430 the second image PI2 obtained by applying the prescribed image processing to rotated second image SI2 is laid out and printed on the A1 size roll paper.

Figure 15:
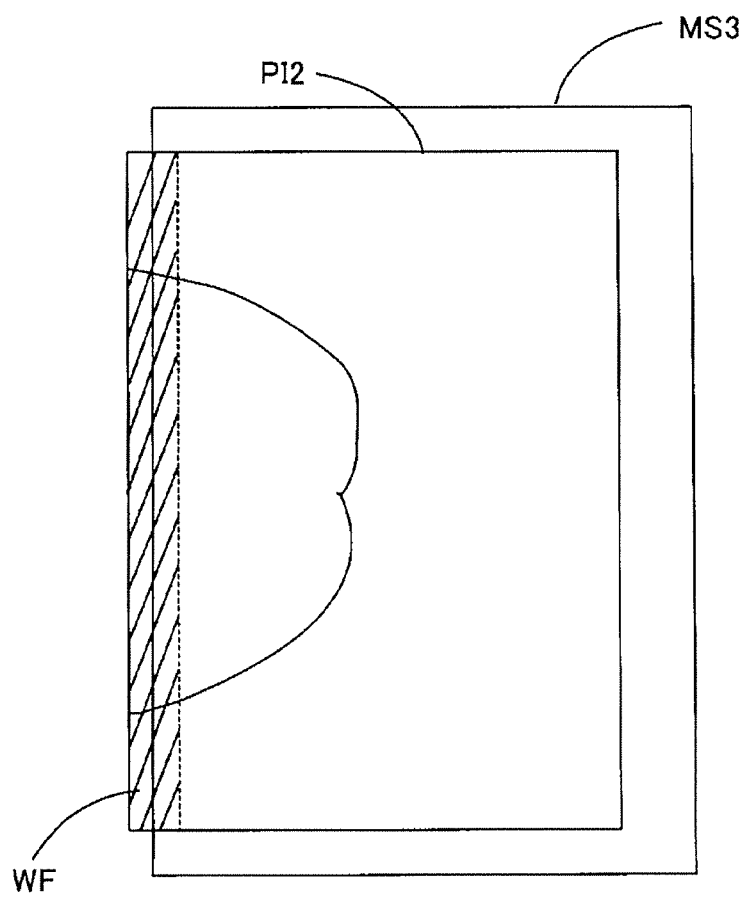
FIG. 15 is shows an example of a printing layout of the second image in which the second image has been rotated according to the first variation.

FIG. 15 shows an example of a layout of the second image PI2 set in step S410. As shown in FIG. 15, the arrangement of the second image PI2 is set on a portion of the A1 roll paper having the aforementioned size MS3 such that a center of the overlapping region WF is coincident with the edge of the paper located on the home side, i.e., the half of the overlapping region WF located on the home side extends beyond the edge of the paper, and such that a margin of a prescribed width is secured on each of the other sides (upper, lower, and right sides) of the paper.

Figure 16:
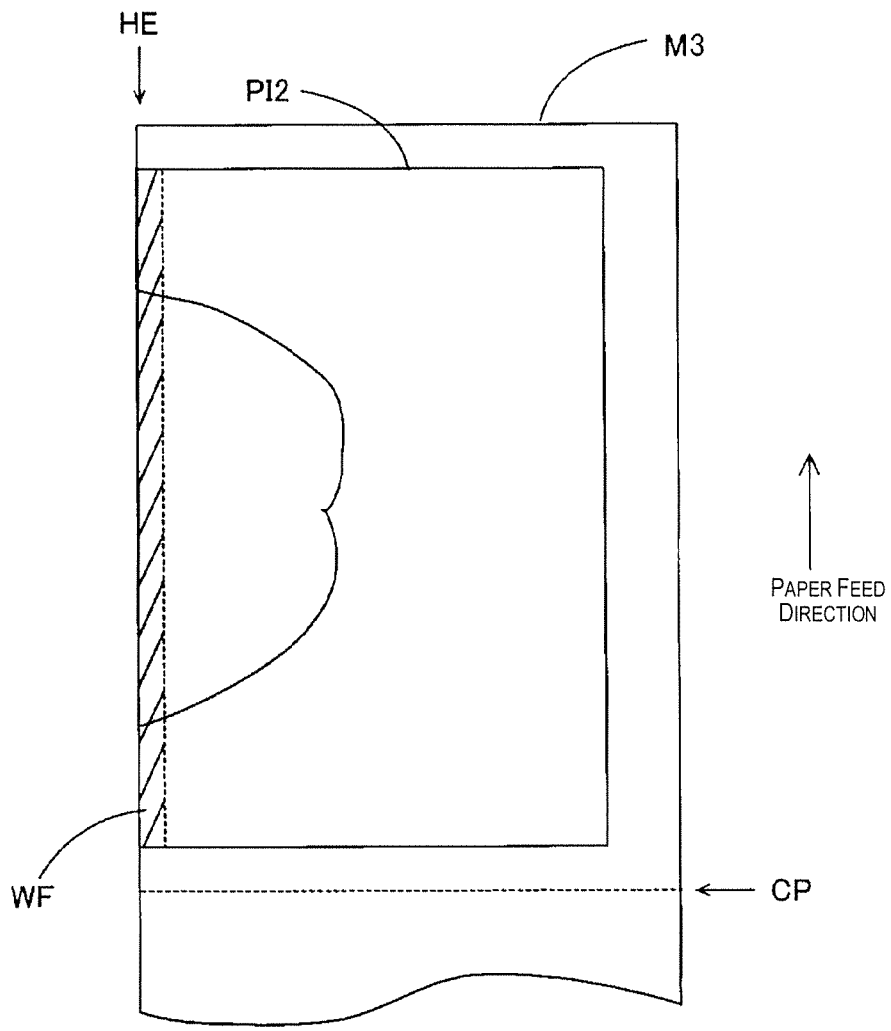
FIG. 16 is shows an example of a print result obtained when the second image has been rotated according to the first variation.

FIG. 16 shows an example of a printing result obtained when the second image PI2 is printed on the paper M3 in step S420. The paper M3 shown in FIG. 16 is also roll paper for A1 size printing. The second image PI2 is printed in a prescribed region of the roll paper starting from a tip end of the roll paper and having a size equal to one sheet of A1 size paper. The second image PI2 is arranged such that half of the overlapping region WF is discarded beyond the home-side edge HE of the paper M3 and only the home-side edge HE is printed without a margin. With this variation, there are situations in which the printer 10 is used to execute poster printing on a size of paper for which normal borderless printing is not possible because a mechanism for borderless printing is not provided in a position corresponding to an edge of the paper located on the full scan side of the printer 10. In such a situation, a first image extracted from an approximate upper half an original document and a second image extracted from an approximate lower half of the original document are each rotated such that a side of the image where an overlapping region WF is formed faces toward the home side. The first image and the second image are then printed such that a portion of the overlapping region WF of each of the images extends beyond the home-side edge of the paper. Consequently, a user can obtain a poster comprising the first image and the second image and having a desired poster size by joining the single borderlessly printed side of the paper on which the first image is printed to the single borderlessly printed side of the paper on which the second image is printed.

Second Variation

In the preceding embodiment and first variation, the first image and the second image are each printed on paper such that a margin is not formed on a long side where an overlapping region WF is formed (partial borderless printing), thereby reducing the time required by a user to fabricate a poster. However, when the two images printed borderlessly at one edge of the paper are joined together, the images do not necessarily join in a completely continuous fashion. For example, if the paper is conveyed by the paper feeding mechanism in a slight diagonal fashion with respect to a paper feed direction, then some of the dots that should have been ejected onto the paper will not reach the paper in a partial region at the edge where partial borderless printing is to occur. As a result, when a plurality of sheets of paper on which partial borderless printing has been executed are joined together, the image lacks continuity.

Conversely, if bordered printing is employed such that a margin is formed along all edges of the paper, then even if the direction of the paper and the direction of the image printed on the paper are slightly offset (at an angle) from each other due to the paper being conveyed in a diagonal state, all of the dots that should be ejected on the paper will basically be ejected onto the paper and the only abnormality will be that the image has crept into a region that is supposed to be a margin. Therefore, if one adopts the viewpoint that it is important to ensure the continuity of the image obtained when the pieces of paper are joined together after printing, then it can be said that bordered printing is better even if cutting off the margins takes extra time. To accommodate such a situation, the printer 10 can be configured such that a user can select a print mode that determines whether the printer will print partially borderlessly or print with borders on all sides.

The flowchart shown in FIG. 3 will now be used to explain this second variation. In step S100, the control section 12 receives a print mode selection from a user via the operating section 15. The user can select between a first quality level print mode and a second quality level print mode displayed on the display section 14. The second quality level corresponds to a higher degree of quality than the first quality level. The first quality level print mode is a mode that places priority on reducing the effort required from the user over obtaining a high quality print result, and the second quality level print mode is a mode that places priority on quality over reducing the effort required from the user. When the first quality level print mode is selected, the control section executes steps S110 to S230 as explained previously. Conversely, when the second quality level print mode is selected, the control section 12 skips steps S130 and S140 while executing steps S110 to S230. Additionally, in steps S160 and S210 the control section 12 sets the layouts of the first image PI1 and the second image PI2 with respect to the paper such that a margin of a prescribed width is formed on the upper, lower, left, and right sides, and in steps S170 and S220 the control section 12 prints the first image PI1 and the second image PI2 onto the paper in accordance with the set layout (bordered printing layout).

The flowchart shown in FIG. 11 will now be used to explain the second variation. In step S300, the control section 12 receives a print mode selection from a user via the operating section 15. When the first quality level print mode is selected, the control section executes steps S310 to S430 as explained previously. Conversely, when executing the steps S310 to S430 after the second quality level print mode has been selected, in steps S350 and S410 the control section 12 sets the layouts of the first image PI1 and the second image PI2 with respect to the paper such that a margin of a prescribed width is formed on the upper, lower, left, and right sides, and in steps S360 and S420 the control section 12 prints the first image PI1 and the second image PI2 onto the paper in accordance with the bordered print layout.

When the rotation processing is executed in steps S330 and S390 after the second quality level print mode has been selected, it is acceptable for the first image and the second image to be rotated 90 degrees in either the leftward direction or the rightward direction, i.e., the direction of rotation is not important. With this variation, a user can obtain a poster that is easier and less time consuming to construct or a poster that has better quality due to better continuity of the image by selecting the first quality level print mode or the second quality level print mode as desired.

Third Variation

Figure 17:
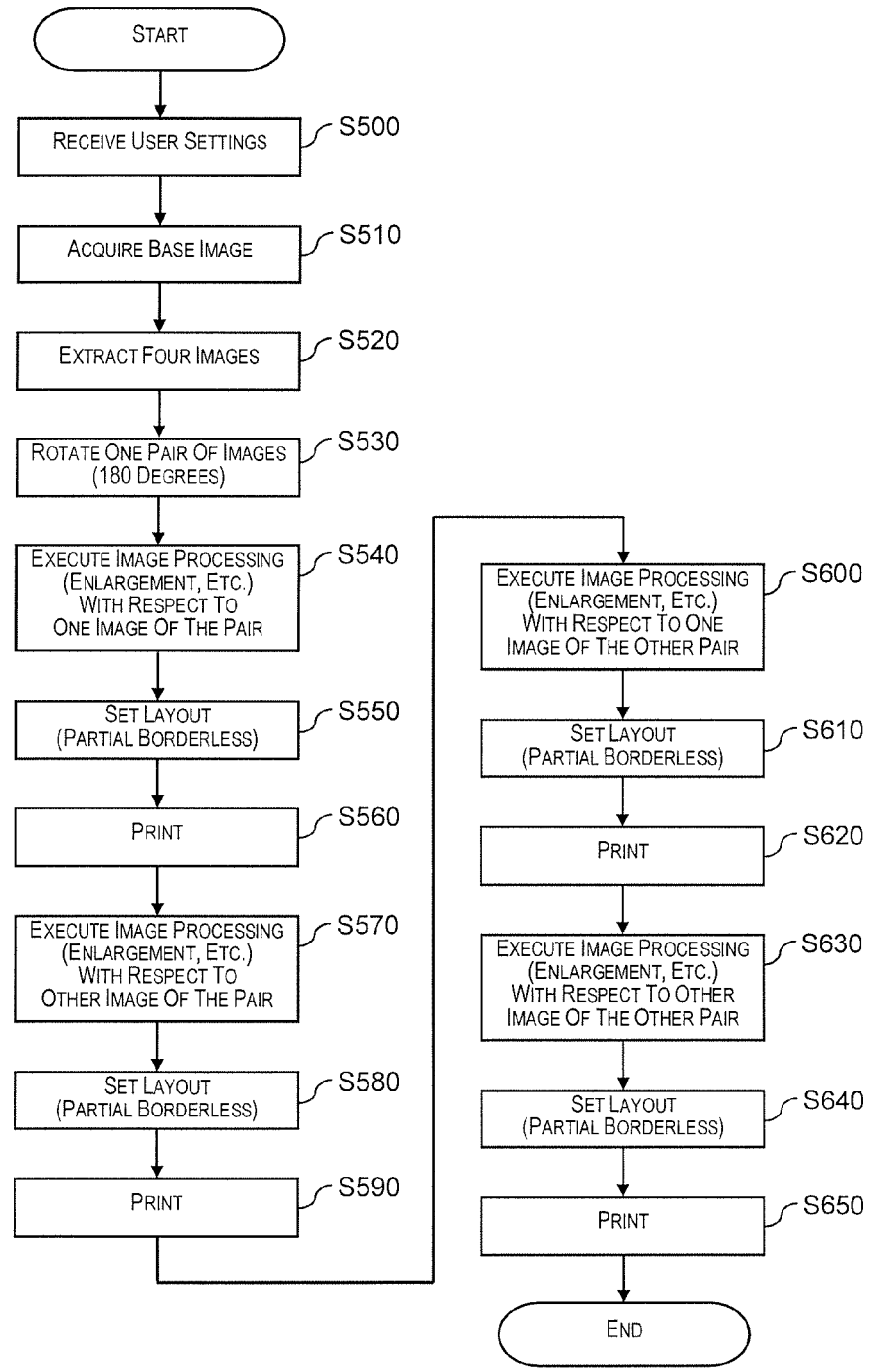
FIG. 17 is a flowchart related to poster printing according to a third variation.

FIG. 17 is a flowchart of steps the printer 10 executes to accomplish poster printing. Some steps are different from the steps of the flowcharts shown in FIG. 3 and FIG. 11. In step S500, the control section 12 receives settings inputted by a user through the operating section 15. In this variation, the original document size is set to A4, paper size used for the enlarged image of the original document is set to A0, and number of sections forming the poster is set to four. The control section 12 sets the paper to be printed on in order to complete the A0 size poster with four sheets of paper to A2 size cut paper. As explained previously, A2 is a size of paper on which the printer 10 cannot print borderlessly. The A2 size cut paper corresponds to the "third type of cut paper" mentioned in the claims.

Step S510 is the same as step S110. In step S520, the control section 12 extracts (sections) four images (first image, second image, third image, and fourth image) from a base image of an original document in a 2×2 arrangement such that images arranged adjacent to each other along a short edge direction partially overlap each other at an overlapping region existing along a dividing line that divides the base image into two equal sections through the short edges of the base image.

Figure 18:
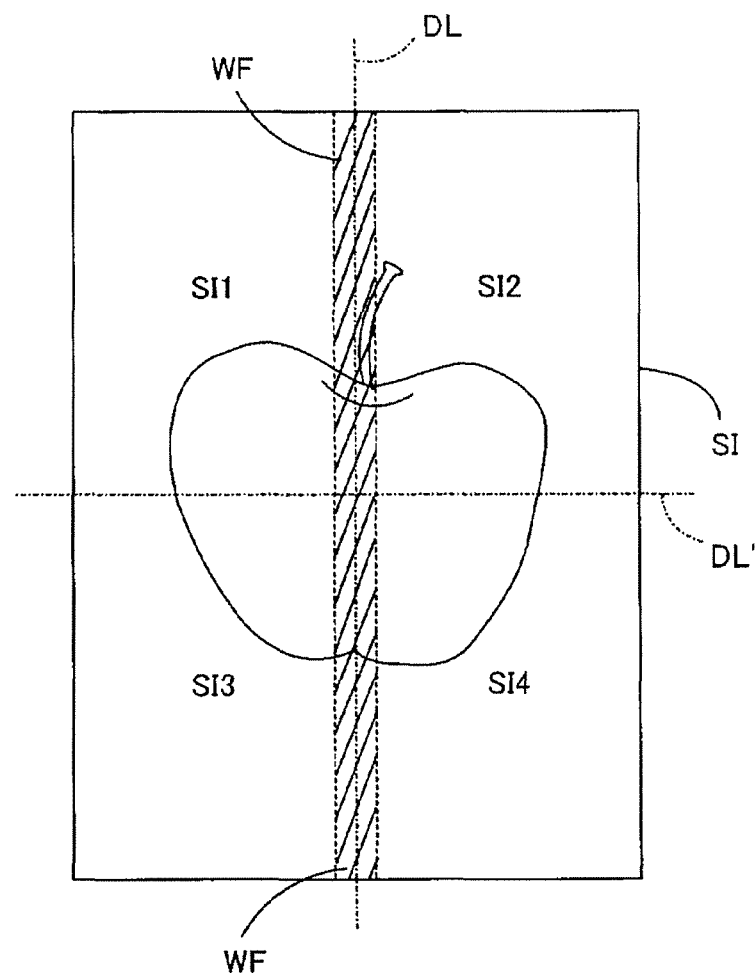
FIG. 18 illustrates an example of a relationship between a base image expressing an original document and a set of first to fourth images in a third variation.

FIG. 18 shows an example of a relationship between a base image SI and a set comprising a first image SI1, a second image SI2, a third image SI3, and a fourth image SI4. In FIG. 18, the base image SI is depicted with a solid line as a rectangular region that is longer in a vertical direction. A dividing line DL passes through the short edges of the base image SI so as to divide the base image SI into two equal halves, and a dividing line DL' passes through the long edges of the base image SI so as to divide the base image SI into two equal halves. The control section 12 defines four rectangular regions each encompassing the entirety of one region demarcated by the dividing lines DL and DL' as well as a portion of the demarcated region that is adjacent in the short edge direction and lies within a prescribed distance of the dividing line DL. These four rectangular regions are set as a first image SI1, a second image SI2, a third image SI3, and a fourth image SI4. Regarding four rectangular regions in the explanation of the flowchart of FIG. 17, the first image is assumed to be the upper left region, the second image SI2 is assumed to be the upper right region, the third image SI3 is assumed to be the lower left region, and the fourth image SI4 is assumed to be the lower right region. Thus, in the example shown in FIG. 18, the first image SI1 and the second image SI2 overlap each other at an overlapping region WF, and the third image SI3 and the fourth image SI4 overlap each other at an overlapping region WF. Meanwhile, the first image SI1 and the third image SI3 are juxtaposed without overlapping, and the second image SI2 and the fourth image SI4 are juxtaposed without overlapping.

Although it is acceptable in this variation to execute the conditional branch at step S130 of FIG. 3, an explanation of the branch is omitted here because the type of paper used in this variation is A2. In step S530, the control section 12 has the image processing section 13 execute a rotation processing with respect to the pair of images whose long edge on the side where the overlapping region WF is formed does not face the home side (i.e., the first image SI1 and the third image SI3 in the example shown in FIG. 18). Thus, the image processing section 13 rotates the first image SI1 and the third image SI3 together (as a single image unit) by 180 degrees. As a result, long edges of the first image SI1 and the third image SI3 on the side where the overlapping region WF exists are made to face the home side in the same manner as long edges of the second image SI2 and the fourth image SI4 on the side where the overlapping region WF exists.

In step S540, the image processing section 13 executes the aforementioned prescribed image processing, i.e., enlargement, etc., with respect to one of the images (first image SI1) of the pair that have been rotated (thereby generating the first image PI1). In step S550, the layout is set in the same manner as in step S160. More specifically, the layout of the first image PI1 with respect to the A2 size cut paper such that a center of the overlapping region WF is coincident with the edge of the paper located on the home side, i.e., the half of the overlapping region WF located on the home side extends beyond the edge of the paper, and such that a margin of a prescribed width is secured on each of the other sides (upper, lower, and right sides) of the paper. In step S560, similarly to step S170, the control section 12 controls the printing mechanism section 16 such that the processed image (first image PI1) is printed onto the paper (A2 cut paper) in accordance with the set layout.

In steps S570 to S590, the same processing as in steps S540 to S560 is executed with respect to the other image of the rotated pair (i.e., the third image SI3). As a result, both the first image PI1 and a third image PI3 (generated based on the third image SI3) are printed partially borderlessly on the A2 size paper, i.e., borderlessly at the long edge where the overlapping region WF is formed. In steps S600 to S620, the same processing as steps S540 to S560 is executed with respect to one of the images (second image SI2) of the pair that was not rotated, and in steps S630 to S650 the same processing as steps S540 to S560 is executed with respect to the other of the images (fourth image SI4) of the pair that was not rotated. As a result, both a second image PI2 (generated based on the first image SI2) and a fourth image PI4 (generated based on the fourth image SI4) are printed partially borderlessly on the A2 size paper, i.e., borderlessly at the long edge where the overlapping region WF is formed.

Figure 19:
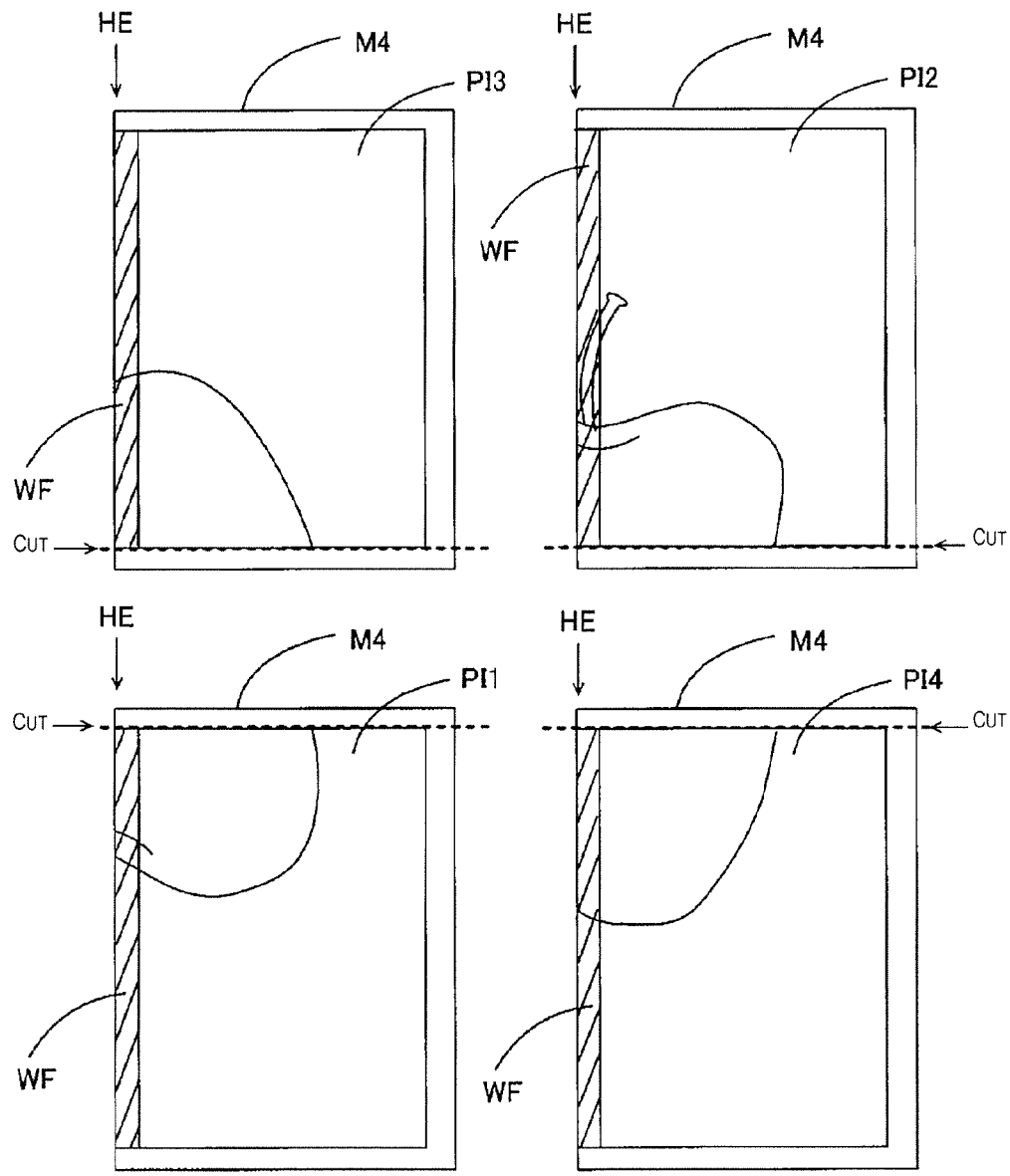
FIG. 19 is shows an example of a print result obtained when the first to fourth images are printed according to the third variation.

FIG. 19 shows an example of the print results obtained when the first image PI1, the second image PI2, the third image PI3, and the fourth image PI4 are printed on paper M4. The paper M4 is A2 size cut paper. The first image PI1, the second image PI2, the third image PI3, and the fourth image PI4 are each printed on a sheet of the paper M4 such that half of the overlapping region WF is discarded beyond the home-side edge HE of the paper M4 and only the home-side edge HE is printed without a margin. Thus, the user can obtain a poster of the desired size by cutting the margins off the sheets of paper M4 along the short sides of the first image PI1, the second image PI2, the third image PI3, and the fourth image PI4 where the images adjoin one another (see the chain lines in FIG. 19) and then joining the four sheets of paper together. Thus, with this variation, the amount of work associated with cutting off margins can be greatly reduced in comparison with a conventional printing scheme even when a single poster is fabricated by piecing together multiple sheets (four sheets) of cut paper having a size on which borderless printing cannot be accommodated. Moreover, the burden placed on the user is greatly reduced because the margin to be cut off is on a short side of the cut paper. Also, since the rotation processing applied to a plurality of images (first image SI1 and the third image SI3) is applied to those images collectively as a unit, the processing load associated with the rotation processing can be reduced.

Figure 20:
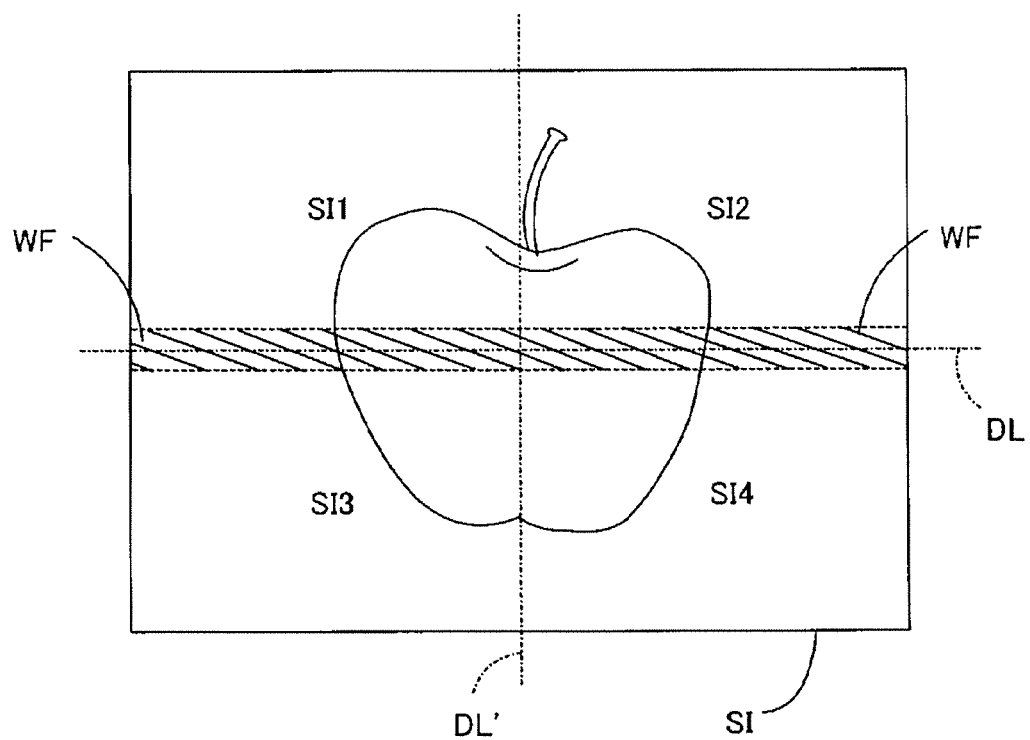
FIG. 20 illustrates an example of a relationship between a base image expressing an original document and a set of first to fourth images in a third variation.

FIG. 20 shows an example of a relationship between a base image SI and a set of images comprising a first image, a second image, a third image, and a fourth image in a case where the base image is longer in a horizontal direction. As can be observed in the figure, the first image SI1 and the third image SI3 overlap each other and the second image SI2 and the fourth image SI4 overlap each other. Meanwhile, the first image SI1 and the second image SI2 are juxtaposed without overlapping and the third image SI3 and the fourth image SI4 are juxtaposed without overlapping. When the first image SI1, the second image SI2, the third image SI3, and the fourth image SI4 are extracted in this manner, the image processing section 13 rotates the first image SI1 and the second image SI2 together as a unit by 90 degrees in a rightward direction and rotates the third image SI3 and the fourth image SI4 together as a unit by 90 degrees in a leftward direction such that the long edge of each of the images on the side corresponding to the overlapping region WF faces toward the home side.

Figure 21:
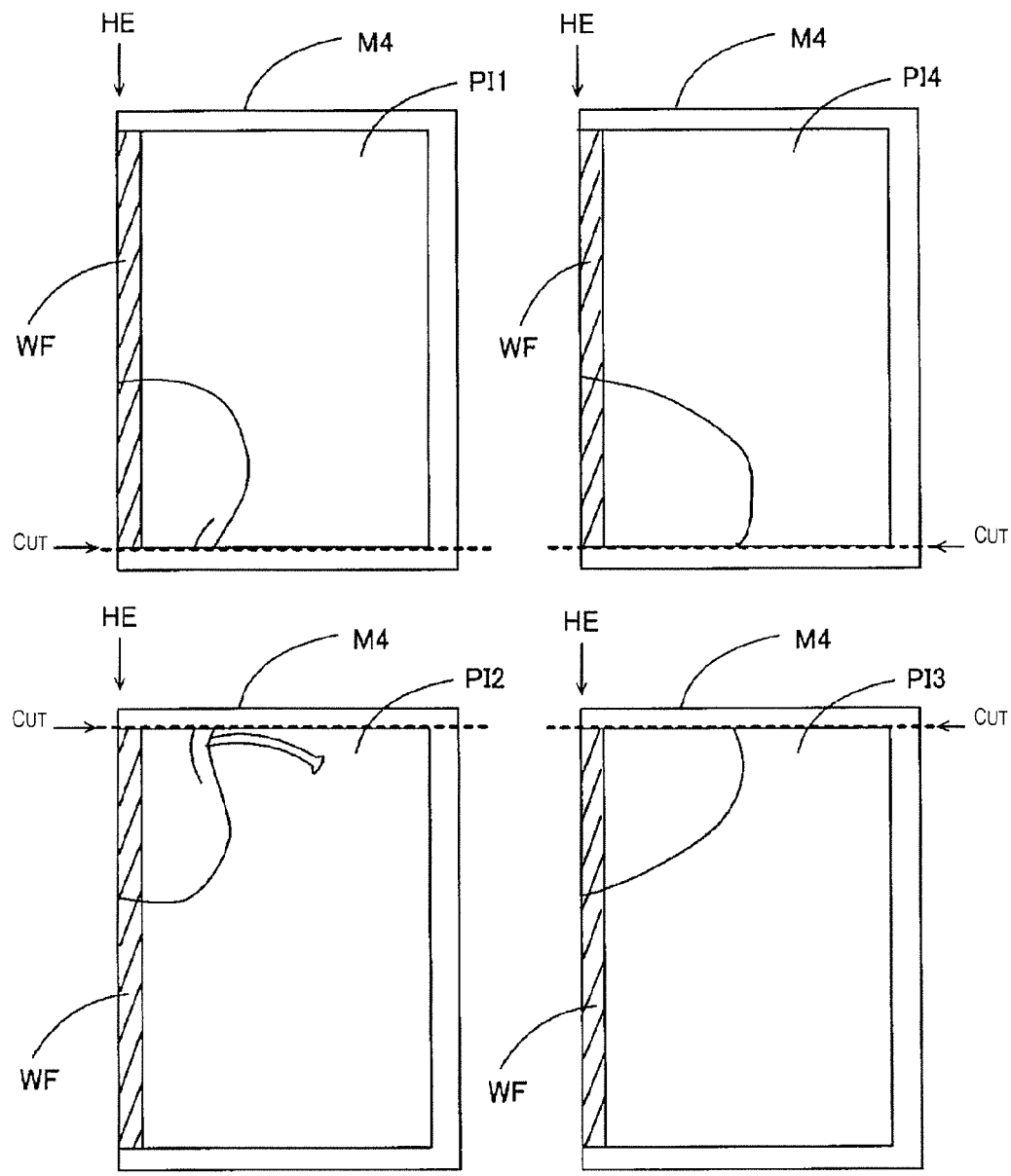
FIG. 21 is shows an example of a print result obtained when the first to fourth images are printed according to the third variation.

As a result, as shown in FIG. 21, the first image PI1, the second image PI2, the third image PI3, and the fourth image PI4 are each printed on a sheet of the paper M4 such that half of the overlapping region WF is discarded beyond the home-side edge HE (long edge) of the paper M4 and only the home-side edge HE is printed without a margin. Thus, in this example, too, the user can obtain a poster of the desired size by cutting the margins off the sheets of paper M4 along the short sides of the first image PI1, the second image PI2, the third image PI3, and the fourth image PI4 where the images adjoin one another (see the chain lines in FIG. 21) and then joining the four sheets of paper together.

Other Variations

In the preceding embodiment and variations, a printer 10 is presented as an example of a printing system according to the present invention. However, it is also acceptable for the printing system to comprise both a PC 30 and a printer 10. For example, the PC 30 can be installed with a printer driver that enables it to function in the same manner as the control section 12 and the image processing section 13. In this way, the PC 30 can set an image layout as explained previously and control the printer 10 with commands such that the generated images (first image PI1, second image PI2, etc.) are printed on paper in accordance with the set layout.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing system comprising:
a printing section that has a mechanism for printing borderlessly at a first edge of a first type of medium and does not have a mechanism for printing borderlessly at a second edge of the first type of medium located on an opposite side of the first type of medium as the first edge;
an extracting section configured to extract a first image and a second image from an original document such that the first image and the second image partially overlap each other at an overlapping portion; and
a control section configured to control the printing section to execute printing onto a first medium of the first type based on the first image using a layout in which at least a portion of the overlapping portion of the first image extends beyond the first edge of the first medium and a margin is formed between the second edge of the first medium and an image edge of the first image located on an opposite side of the overlapping portion of the first image, and to control the printing section to execute printing onto a second medium of the first type based on the second image using a layout in which at least a portion of the overlapping portion of the second image extends beyond the first edge of the second medium and a margin is formed between the second edge of the second medium and an image edge of the second image located on an opposite side of the overlapping portion of the second image.

2. The printing system recited in claim 1, further comprising
a rotating section configured to rotate the first image such that the overlapping portion of the first image and the overlapping portion of the second image are oriented in the same direction,
the printing section further including a mechanism for printing borderlessly at a first edge of a second type of medium and a second edge located on an opposite side of the second type of medium as the first edge,
the control section being configured such that
when printing will be executed onto a medium of the first type, the control section executes control such that the rotating section rotates the first image and the printing section executes printing onto a first medium of the first type based on the first image using a layout in which at least a portion of the overlapping portion of the rotated first image extends beyond the first edge of the first medium and a margin is formed between the second edge of the first medium and an image edge of the first image located on an opposite side of the overlapping portion of the first image, and
when printing will be executed onto a medium of the second type, the control section controls the printing section to execute printing onto a third medium of the second type based on the first image using a layout in which at least a portion of the overlapping portion of the first image extends beyond the second edge of the third medium and a margin is formed between the first edge of the third medium and an image edge of the first image located on an opposite side of the overlapping portion of the first image, and also controls the printing section to execute printing onto a fourth medium of the second type based on the second image using a layout in which at least a portion of the overlapping portion of the second image extends beyond the first edge of the fourth medium and a margin is formed between the second edge of the fourth medium and an image edge of the second image located on an opposite side of the overlapping portion of the second image.

3. The printing system recited in claim 1, wherein
the printing section executes printing by ejecting ink droplets onto a medium, and
the mechanism for printing borderlessly is an ink receiving member for receiving ink droplets that are ejected beyond the medium.

4. The printing system recited in claim 1, wherein
the control section is configured such that either a printing mode characterized by a first quality level or a printing mode characterized by a second quality level that is higher in quality than the first quality level is selected from an external source, and configured to control the printing section such that the printing section executes printing using a layout in which a portion of an image extends beyond at least one edge of a medium when the printing mode characterized by the first quality level is selected and such that the printing section executes printing using a layout in which a margin is formed between the image and four edges of the medium when the printing mode characterized by the second quality level is selected.

5. The printing system recited in claim 1, wherein
the printing section includes a mechanism for printing borderlessly at a first edge of a third type of cut paper and not provided with a mechanism for printing borderlessly at any edges of the third type of cut paper other than the first edge,
the extracting section is configured to extract four images from an original document in a 2×2 arrangement such that images arranged adjacent to each other along a short edge direction partially overlap each other at an overlapping portion existing along a long edge,
the printing system includes a rotating section configured to rotate a pair of the images such that one pair of the images comprising two of the images arranged adjacent to each other in a long edge direction and another pair of the images comprising two of the images arranged adjacent to each other in a long edge direction are arranged in such an orientation that a long edge on the side of the one pair of images where the overlapping portion exists and a long edge on the side of the other pair of images where an overlapping portion exists face in the same direction, and
the control section is configured to control the printing section to print the four images onto sheets of the third type of cut paper using a layout in which at least a portion of the overlapping portion of each of the images extends beyond the first edge of the cut paper and a margin is formed between the image and each of the edges other than the first edge.

6. A printing control method for causing a printing apparatus to execute printing with the printing apparatus having a mechanism for printing borderlessly at a first edge of a first type of medium and does not have a mechanism for printing borderlessly at a second edge of the first type of medium located on an opposite side of the first type of medium as the first edge, the printing control method comprising:
extracting a first image and a second image from an original document such that the first image and the second image partially overlap each other at an overlapping portion; and
controlling the printing apparatus to execute printing onto a first medium of the first type based on the first image using a layout in which at least a portion of the overlapping portion of the first image extends beyond the first edge of the first medium and a margin is formed between the second edge of the first medium and an image edge of the first image located on an opposite side of the overlapping portion of the first image, and controlling the printing apparatus to execute printing onto a second medium of the first type based on the second image using a layout in which at least a portion of the overlapping portion of the second image extends beyond the first edge of the second medium and a margin is formed between the second edge of the second medium and an image edge of the second image located on an opposite side of the overlapping portion of the second image.

7. A non-transitory computer readable medium having stored thereon a printing control program which is executable by a computer for controlling a printing apparatus having a mechanism for printing borderlessly at a first edge of a first type of medium and does not have a mechanism for printing borderlessly at a second edge of the first type of medium located on an opposite side of the first type of medium as the first edge, the printing control program controls the computer to execute function of:
extracting a first image and a second image from an original document such that the first image and the second image partially overlap each other at an overlapping portion; and
controlling the printing apparatus to execute printing onto a first medium of the first type based on the first image using a layout in which at least a portion of the overlapping portion of the first image extends beyond the first edge of the first medium and a margin is formed between the second edge of the first medium and an image edge of the first image located on an opposite side of the overlapping portion of the first image, and controlling the printing apparatus to execute printing onto a second medium of the first type based on the second image using a layout in which at least a portion of the overlapping portion of the second image extends beyond the first edge of the second medium and a margin is formed between the second edge of the second medium and an image edge of the second image located on an opposite side of the overlapping portion of the second image.

* * * * *